US011223111B2

(12) United States Patent
Taylor et al.

(10) Patent No.: US 11,223,111 B2
(45) Date of Patent: Jan. 11, 2022

(54) SYSTEMS AND METHODS FOR PROVIDING ANTENNAS WITH MECHANICALLY COUPLED OFFSET POSITIONS

(71) Applicant: Eagle Technology, LLC, Melbourne, FL (US)

(72) Inventors: Robert M. Taylor, Rockledge, FL (US); Timothy L. Fetterman, Palm Bay, FL (US); Philip J. Henderson, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/899,269

(22) Filed: Jun. 11, 2020

(65) Prior Publication Data
US 2021/0391643 A1    Dec. 16, 2021

(51) Int. Cl.
*H01Q 1/28*        (2006.01)
*H01Q 3/08*        (2006.01)
(Continued)

(52) U.S. Cl.
CPC ............. *H01Q 1/288* (2013.01); *H01Q 1/125* (2013.01); *H01Q 1/1235* (2013.01); *H01Q 3/08* (2013.01); *H01Q 3/20* (2013.01)

(58) Field of Classification Search
CPC ............ H01Q 3/02; H01Q 3/08; H01Q 1/125; H01Q 1/288; H01Q 15/161; H01Q 15/16; H01Q 1/10; H01Q 1/14; H01Q 1/1242; H01Q 1/126; H01Q 1/1235; B64G 1/222; B64G 1/66
See application file for complete search history.

(56) References Cited

U.S. PATENT DOCUMENTS

| 4,380,013 A | * | 4/1983 | Slysh | H01Q 1/288 |
| | | | | 343/753 |
| 5,857,648 A | * | 1/1999 | Dailey | B64G 1/222 |
| | | | | 244/172.6 |

(Continued)

FOREIGN PATENT DOCUMENTS

| EP | 2825827 A1 | 1/2015 |
| WO | 2018017174 A2 | 1/2018 |

OTHER PUBLICATIONS

Van't Klooster, C.G.M. et al., "Large Deployable Reflector Configuration for Spacebased Applications in Telecommunications, Science, and Remote Sensing," Dec. 2013 DOI:10.1007/s12567-013-0044-7.

*Primary Examiner* — Dimary S Lopez Cruz
*Assistant Examiner* — Yonchan J Kim
(74) *Attorney, Agent, or Firm* — Fox Rothschild LLP; Robert J. Sacco; Carol E. Thorstad-Forsyth

(57) ABSTRACT

Systems and methods for deploying an extendable reflector structure. The methods comprise: transitioning the extendable reflector structure from a stored configuration to a deployed configuration; and causing expansion of a pantograph coupling structure while the extendable reflector structure is being transitioned from the stored configuration to the deployed configuration. The pantograph coupling structure indirectly couples the extendable reflector structure to a boom such that a beam produced by the extendable reflector structure during operation is offset from a focal axis of the extendable reflector structure by a certain amount.

26 Claims, 19 Drawing Sheets

(51) Int. Cl.
*H01Q 3/20* (2006.01)
*H01Q 1/12* (2006.01)

(56) References Cited

U.S. PATENT DOCUMENTS

| | | |
|---|---|---|
| 6,859,188 B1 | 2/2005 | Matthews et al. |
| 10,062,951 B2 | 8/2018 | Daniel et al. |
| 10,283,835 B2 | 5/2019 | Harvey et al. |
| 2015/0060605 A1* | 3/2015 | Tserodze ................ H01Q 1/288 |
| | | 244/172.6 |
| 2017/0093046 A1* | 3/2017 | Harvey .................... H01Q 1/08 |

* cited by examiner

SYSTEMS AND METHODS FOR PROVIDING ANTENNAS WITH MECHANICALLY COUPLED OFFSET POSITIONS

BACKGROUND

Statement of the Technical Field

The present document concerns antenna structures. More particularly, the present document concerns systems and methods for providing antennas with mechanically coupled offset positions.

Description of the Related Art

Satellites require Radio Frequency ("RF") energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. This transition typically relies on deployable mechanical structures.

SUMMARY

This document concerns systems and methods for deploying an extendable reflector structure. The methods comprise: transitioning the extendable reflector structure from a stored configuration to a deployed configuration; causing expansion of a pantograph coupling structure while the extendable reflector structure is being transitioned from the stored configuration to the deployed configuration; and/or stiffening the pantograph coupling structure using a plurality of cords. The pantograph coupling structure indirectly couples the extendable reflector structure to a boom such that a beam produced by the extendable reflector structure during operation is offset from a focal axis of the extendable reflector structure by a certain amount. The height of the extendable reflector structure may be reduced during the transitioning.

In some scenarios, the extendable reflector structure may comprise a flexible antenna reflector surface, a surface shaping cord network, and a support structure. The pantograph coupling structure is coupled to a vertical batten of the support structure.

In those or other scenarios, the expansion of the pantograph coupling structure is achieved by causing a pivotal movement of a first end of a first bar around a first pivot point adjacent to the boom, a pivotal movement of a first end of a second bar around a second pivot point adjacent to the expandable reflector structure, a pivotal movement by a second end of the first bar around a third pivot point adjacent to the expandable reflector structure, a pivotal movement by a second end of the second bar around a fourth pivot point adjacent to the boom, a sliding engagement of the second end of the second bar to the boom, and a pivotal movement of the first and second bars relative to each other. The expansion of the pantograph coupling structure may further be achieved by a decrease in length of a vertical batten of the extendable reflector structure to which the first and second bars are coupled. The first and second bars have equal or different lengths.

In those or other scenarios, the pantograph coupling structure comprises at least two pantograph segments coupled in series between the boom and the extendable reflector structure. Alternatively or additionally, the pantograph coupling structure comprises at least two pantograph structures coupled between the boom and the extendable reflector structure so as to be angled relative to each other. Each of the at least two pantograph structures comprises a single pantograph segment connected in series between the boom and the extendable reflector structure, or two or more pantograph segments connected in series between the boom and the extendable reflector structure.

This document also concerns systems comprising: a boom; an extendable reflector structure that is transitionable from a stored configuration to a deployed configuration; a pantograph coupling structure that (a) expands while the extendable reflector structure is being transitioned from the stored configuration to the deployed configuration, and (b) indirectly couples the extendable reflector structure to the boom such that a beam produced by the extendable reflector structure during operation is offset from a focal axis of the extendable reflector structure by a certain amount; and/or cords that stiffen the pantograph coupling structure. The height of the extendable reflector structure may be reduced during the transition from the stored configuration to the deployed configuration.

In some scenarios, the extendable reflector structure comprises a flexible antenna reflector surface, a surface shaping cord network, and a support structure. The pantograph coupling structure is coupled to a vertical batten of the support structure.

In those or other scenarios, an expansion of the pantograph coupling structure is achieved by a pivotal movement of a first end of a first bar around a first pivot point adjacent to the boom, a pivotal movement of a first end of a second bar around a second pivot point adjacent to the expandable reflector structure, a pivotal movement by a second end of the first bar around a third pivot point adjacent to the expandable reflector structure, a pivotal movement by a second end of the second bar around a fourth pivot point adjacent to the boom, a sliding engagement of the second end of the second bar to the boom, and a pivotal movement of the first and second bars relative to each other. The expansion of the pantograph coupling structure may be further achieved by a decrease in length of a vertical batten of the extendable reflector structure to which the first and second bars are coupled. The first and second bars have equal or different lengths.

In those or other scenarios, the pantograph coupling structure comprises at least two pantograph segments coupled in series between the boom and the extendable reflector structure. Alternatively, at least two pantograph structures coupled between the boom and the extendable reflector structure so as to be angled relative to each other. Each of the at least two pantograph structures comprises a single pantograph segment connected in series between the boom and the extendable reflector structure, or two or more pantograph segments connected in series between the boom and the extendable reflector structure.

BRIEF DESCRIPTION OF THE DRAWINGS

This disclosure is facilitated by reference to the following drawing figures, in which like numerals represent like items throughout the figures.

DETAILED DESCRIPTION

Figure 1:
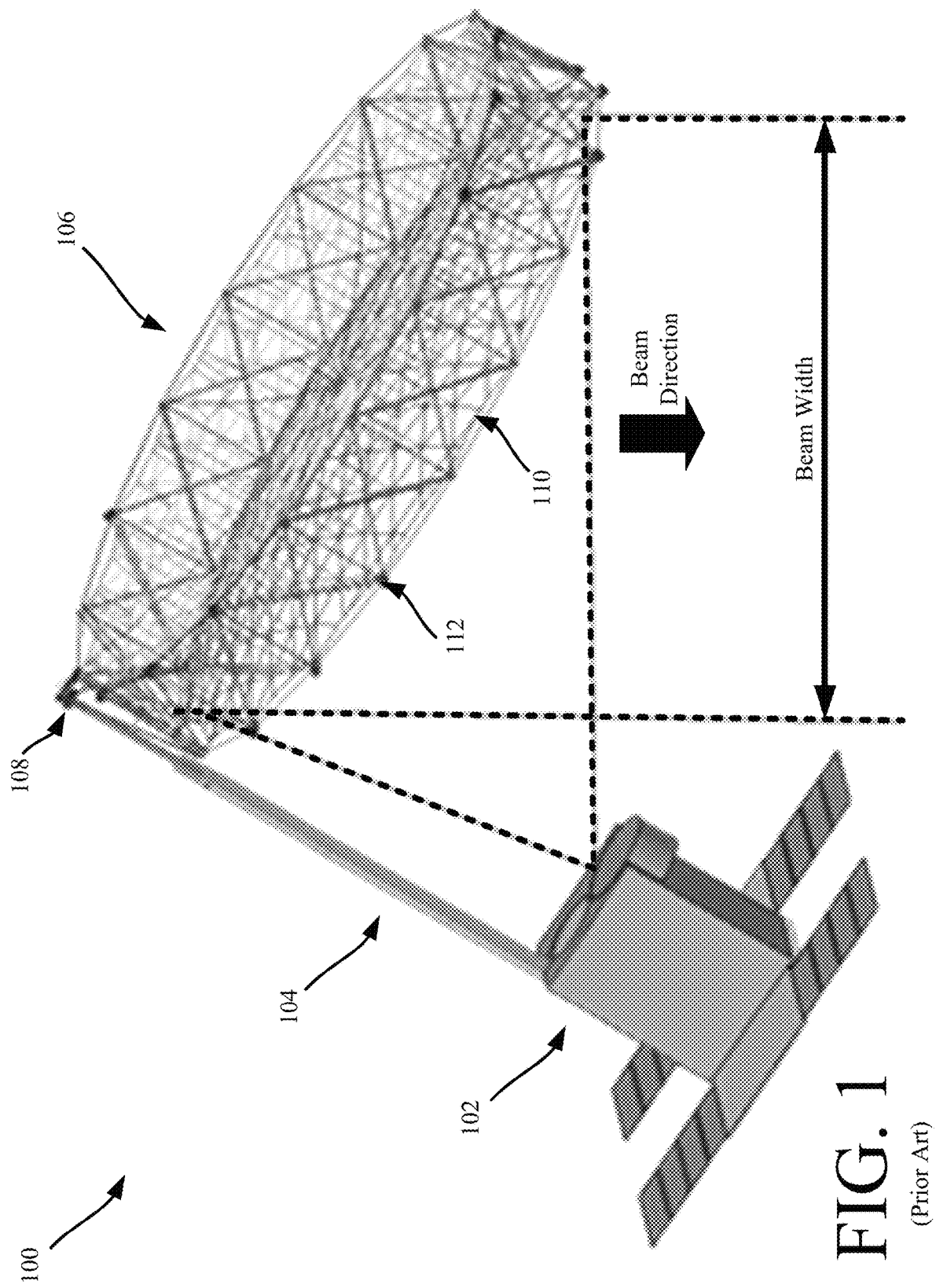
FIG. 1 provides an illustration of a conventional system.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The present solution relates to a vehicle (e.g., a spacecraft such as a satellite) with a perimeter truss reflector. The perimeter truss reflector has a mechanical deployment which is based on a perimeter hoop structure. It is difficult to couple the pantograph hoop structure to a boom of the vehicle such that a deployed geometry of the perimeter truss reflector can be varied for different missions or applications.

One solution to this problem is to hard mount the pantograph truss reflector directly to the boom of the vehicle. This solution is illustrated in FIG. 1. As shown in FIG. 1, an illustrative system 100 comprises a spacecraft 102, a telescoping boom 104 and a perimeter truss reflector 106. Each of the listed components is well known in the art, and therefore will not be described in detail herein. The perimeter truss reflector 106 comprises a perimeter hoop structure 112 that is directly coupled to the telescoping boom 104. This direct coupling allows the perimeter truss reflector 106 to be coupled to and extend from a distal end 108 of the telescoping boom when the telescoping boom is in its extended position shown in FIG. 1.

The direct coupling between the perimeter truss reflector 106 and boom 104 has certain disadvantages. For example, there are very few options for allowing a spacecraft provider to change the deployed geometry of the perimeter truss reflector's parabola (e.g., a change in the position and/or orientation of the parabolic reflector surface 110 relative to the spacecraft 102). Additionally, this direct coupling configuration does not allow for different sized feeds, different feed positions, and/or different feed pointing angles relative to the spacecraft 102.

Figure 2:
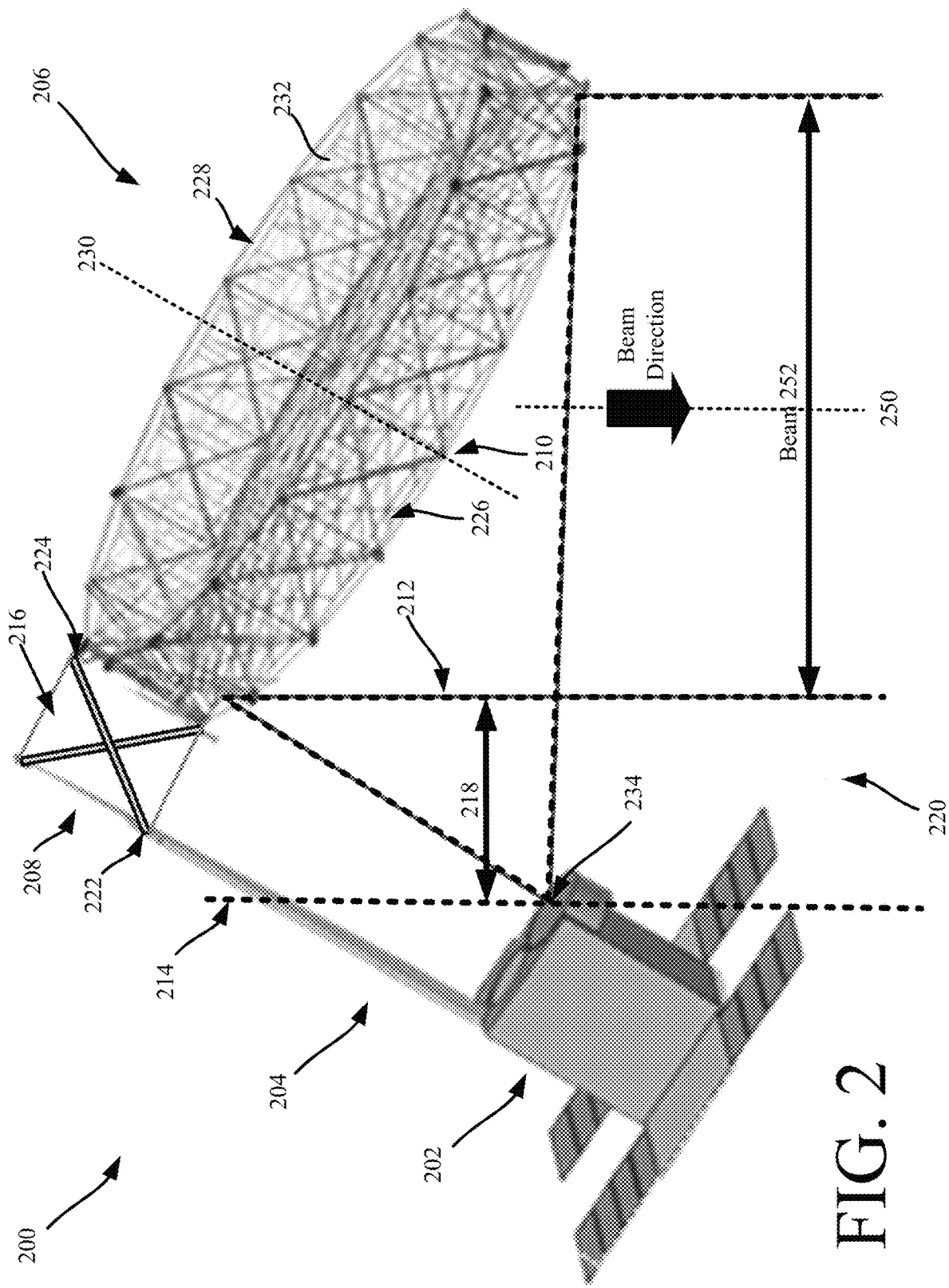
FIG. 2 provides an illustration of an illustrative system that is useful for understanding the present solution.

Therefore, another solution has been derived to overcome these drawbacks of the direct coupling solution. This solution allows for adjustments in a reflector's deployed parabolic geometry. This solution involves indirectly coupling a reflector structure to a boom via a pantograph coupling structure. An illustration that is useful for understanding this solution is provided in FIG. 2. As shown in FIG. 2, the illustrative system 200 comprises a spacecraft 202, a boom 204 and an extendable reflector structure 206. Each of the listed components is well known in the art, and therefore will not be described in detail herein. Any known or to be known spacecraft, boom and/or extendable reflector structure can be used herein without limitation.

In FIG. 2, the spacecraft 202 is shown as comprising a satellite. The present solution is not limited in this regard. Other types of ground, aerial or space vehicles can be used with the present solution.

The boom 204 is shown as comprising a telescoping boom. The present solution is not limited in this regard. Other types of booms (e.g., an articulating boom and a constant diameter boom) can be used with the present solution. The telescoping boom is designed to be transitioned between a collapsed position shown in FIG. 6 and an expanded position shown in FIGS. 2 and 8. This transition can be achieved using motors, gears, pulleys, ropes, cords, a cycling slit-tube deployer, and/or any other mechanical mechanism.

Figure 8:
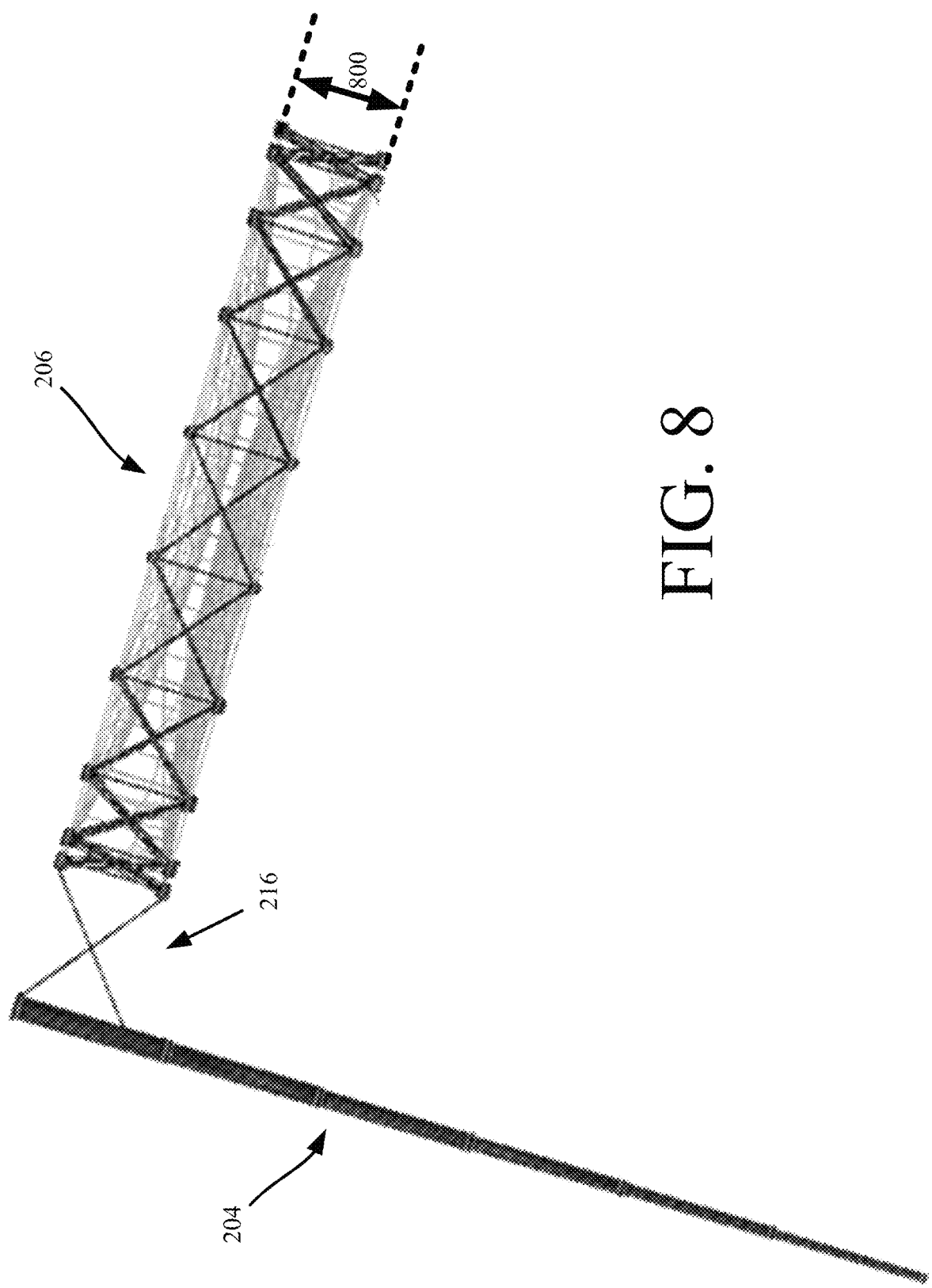
FIG. 8 provides an illustration of the boom, pantograph coupling structure, and extendable reflector structure in a fully expanded or deployed position.

The extendable reflector structure 206 has an appearance that is similar to or the same as a perimeter truss reflector. The extendable reflector structure 206 can include but is not limited to, a perimeter truss mesh reflector available from L3Harris of Melbourne, Fla. The extendable reflector structure 206 has a circular, parabolic shape when it is in its fully extended or deployed position as shown in FIGS. 2 and 8. The extendable reflector structure 206 includes a flexible antenna reflector surface 226, a surface shaping (or tension) cord network 228, and a support structure 210. The support structure 210 is also referred to herein a perimeter hoop structure.

The reflector surface 226 is formed from any material that is suitable as an antenna's reflective surface. Such materials include, but are not limited to, reflective wire knit mesh materials similar to light weight knit fabrics. In its fully extended or deployed position shown in FIGS. 2 and 8, the reflector surface 226 has a size and shape selected for directing RF energy into a desired pattern.

An antenna feed 234 is located on the spacecraft 202 so as to face a concave surface of the antenna reflector 226 that is intended to concentrate RF energy in a desired pattern. The antenna feed is configured to either illuminate the concave surface of the antenna reflector 226 with RF energy or be illuminated by the antenna reflector 226 that has gathered RF energy from a distant source. Antenna feeds are well known in the art, and therefore will not be described herein. Any known or to be known antenna feed can be used herein in accordance with a given application.

As shown in FIG. 2, the reflector surface 226 extends around a central longitudinal axis 230 of the extendable reflector structure 206. As such, the reflector surface 226 may be a curve symmetrically rotated about the central longitudinal axis 230, a paraboloid rotated around an offset and inclined axis, or a surface shaped to focus the RF signal in a non-symmetric pattern.

The reflector surface 226 is fastened to the support structure 210 via the surface shaping cord network 228. The surface shaping cord network 228 supports the reflector surface 226 creating a parabolic or other reflecting shape. The reflector surface 226 is dominantly shaped by the surface shaping cord network 228.

The surface shaping cord network 228 defines and maintains the shape of the reflector surface 226 when in use. In this regard, the surface shaping cord network 228 includes a plurality of interconnected cords (or thread like strings) 232. The cords 232 are positioned between the reflector surface 226 and the support structure 210 so as to provide structural stiffness to the reflector surface 226 when the extendable reflector structure 206 is in use.

When the extendable reflector structure 206 is in its fully extended or deployed configuration, the surface shaping cord network 228 is a stable structure under tension. The tension is achieved by applying pulling forces to the cords by means of the support structure 210.

Figure 3:
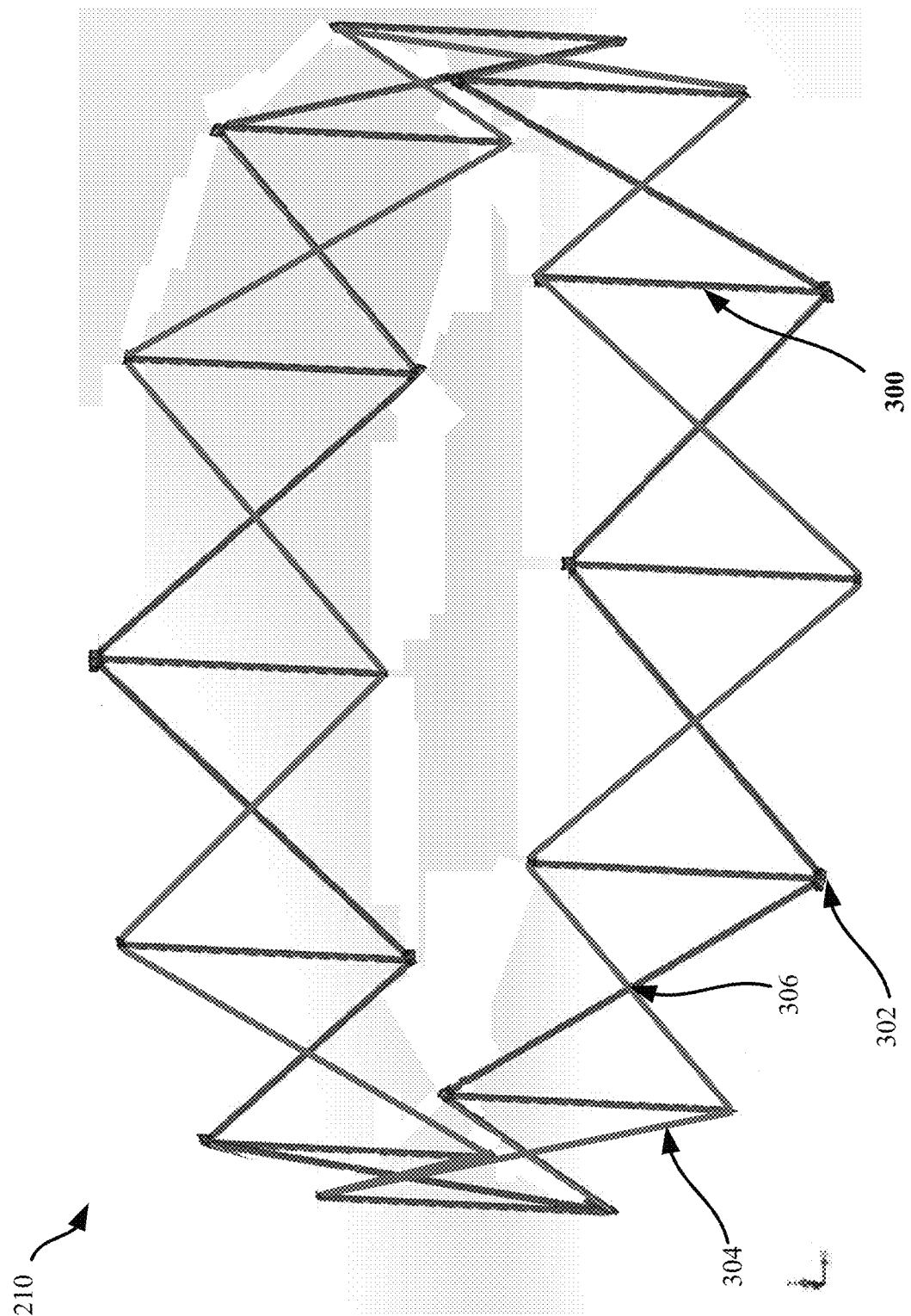
FIG. 3 provides an illustration of the support structure shown in FIG. 1 in an expanded position.
Figure 4:
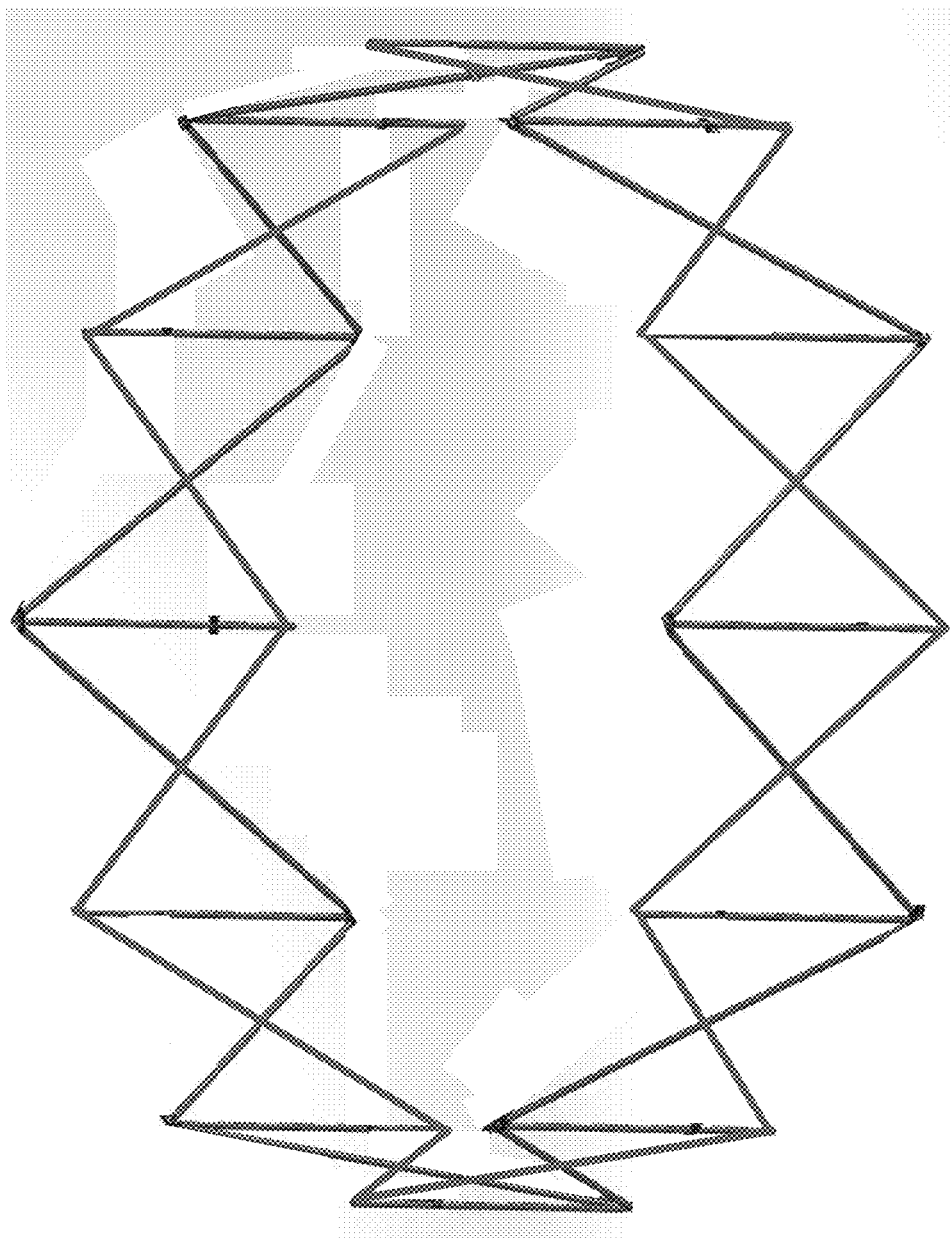
FIG. 4 provides an illustration of the support structure shown in FIG. 3 in a partially expanded position.
Figure 5:
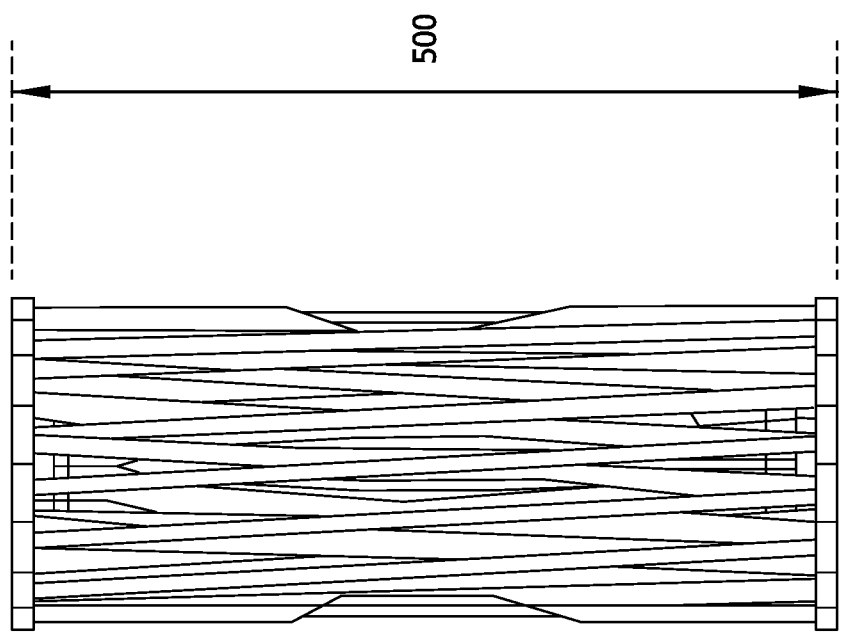
FIG. 5 provides an illustration of the support structure shown in FIGS. 3-4 in a stored or stowed position.

The support structure 210 is a foldable structure that can be transitioned from a fully stowed or non-extended position shown in FIG. 5 to a fully extended position shown in FIG. 3. A partially extended position of the support structure 210 is shown in FIG. 4. Notably, a height of the extendable reflector structure is reduced during the transitioning. For example, the value 800 of the support structure's height shown in FIG. 8 is larger than the value 500 of the support structure's height shown in FIG. 5.

Techniques for transitioning the support structure 210 from the stowed or non-extended position shown in FIG. 5 to a fully extended position shown in FIG. 3 are well known in the art, and therefore will not be described in detail herein. In some scenarios, a pulling force is applied to a cord that causes the support structure to transition from the fully stowed or non-extended position shown in FIG. 5 to the fully extended position shown in FIG. 3. This cord may be disposed at least within boom 204, and may be pulled using a spool which is rotated by a motor. The present solution is not limited in this regard.

The support structure 210 has a pantograph based arrangement. Accordingly, the support structure 210 is formed of a plurality of vertical battens 300 that are coupled to each other via joint mechanisms 302 and angled battens 304. Joint mechanisms 302 allow battens 300 to move away from and towards adjacent vertical battens. Two angled battens 304 are provided between each pair of vertical battens 300. The two angled battens 304 are coupled together in the middle via a coupling mechanism 306 (e.g., a pin). The angled battens pivot about the coupling mechanism 306 when a respective pair of vertical battens are moved towards or away from each other. The battens 300 may change lengths during deployment. Accordingly, the battens 300 can include, but are not limited to, cords or telescoping members. A simple pantograph does not include the battens 300.

Figure 6:
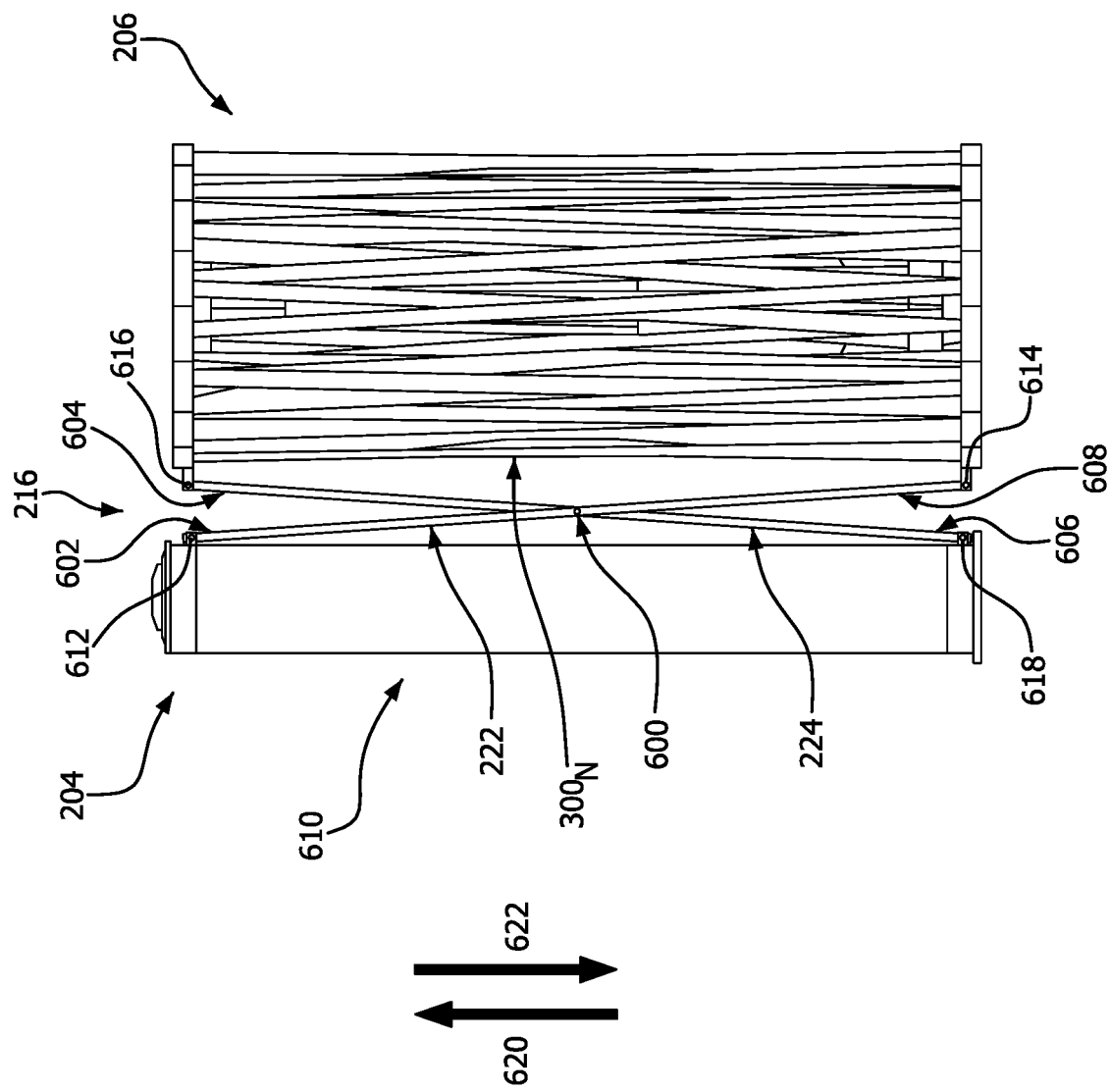
FIG. 6 provides an illustration of an extendable reflector structure coupled a boom via a pantograph coupling structure having bars with equal lengths.

As shown in FIGS. 2 and 6, the support structure 210 is indirectly coupled to the telescoping boom 204 via a pantograph coupling structure 216. This indirect coupling allows the extendable reflector structure 206 to be coupled to and extend from a distal end portion 208 of the telescoping boom 204 when the telescoping boom is in its extended position shown in FIG. 2.

The pantograph coupling structure 216 comprises at least two bars 222, 224 connected together at the middle thereof by a coupling mechanism 600 (e.g., a pin) visible in FIG. 6. The bars 222, 224 are pivotable about the coupling mechanism 600. Each bar 222, 224 has two opposing ends 602/608 or 604/606, and is formed of a rigid or semi-rigid material. Such material includes, but is not limited to, a metal, a plastic, and a composite. Each bar can comprise a solid bar or a hollow tube. In the hollow tube scenario, the cord (that is pulled to cause an extension of the extendable reflector structure 206) may be disposed within at least one of the bars 222, 224, but also may function parasitically with the deployment of the extendable reflector structure 206.

A first end 602 of bar 222 is securely and fixedly coupled to a top end of the boom 204. End 602 of bar 222 is not able to slidingly move relative to boom 204, but is able to pivot about a pivot pin 612 that is adjacent to the boom's top end.

The second end 608 of bar 222 is securely and fixedly coupled to a bottom end of a vertical batten $300_N$ of the support structure 210. The second end 608 of bar 222 is not able to slidingly move relative to the vertical batten $300_N$, but is able to pivot about a pivot pin 614 that is adjacent to the vertical batten's bottom end.

The first end 604 of bar 224 is securely and fixedly coupled to a top end of the vertical batten $300_N$ of the support structure 210. This end of the vertical batten $300_N$ is opposite to the end of the vertical batten $300_N$ to which end 608 of bar 222 is coupled. End 604 of bar 224 is not able to slidingly move relative to the vertical batten $300_N$, but is able to pivot about a pivot pin 616 that is adjacent to the vertical batten's top end.

The second end 606 of bar 224 is coupled to a bottom end of an outer most telescoping segment 610 of the boom 204 such that the second end 606 slidingly engages boom 204. The sliding engagement is achieved using a track, rollers, a channel, wheels, or other mechanical sliding means. Tracks, rollers, channels and other mechanical sliding means are well known in the art, and therefore will not be described herein. The sliding engagement allows the second end 606 of bar 224 to move in opposing directions shown by arrows 620, 622. As end 606 slides along boom 204 in either direction 620, 622, bar 224 pivots about pivot point 600 and about a pivot pin 618 that is adjacent to the boom's bottom end.

Figure 7:
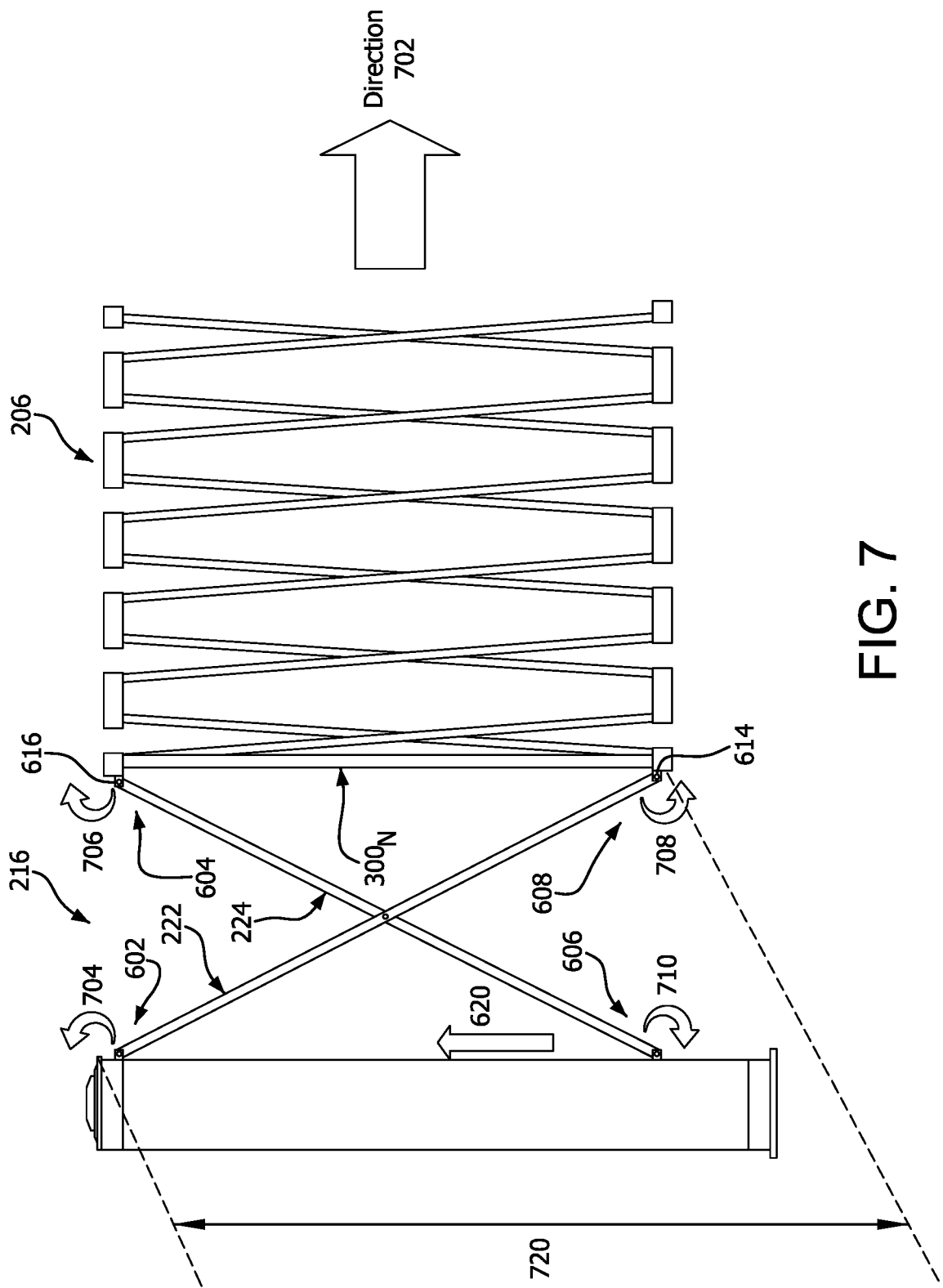
FIG. 7 provides an illustration of the extendable reflector structure and the pantograph coupling structure shown in FIG. 6 being expanded.

As shown in FIG. 7, the pantograph coupling structure 216 expands during the deployment of the extendable reflector structure 206. This expansion results in the transition of the pantograph coupling structure 216 from a compressed state shown in FIG. 6 to a partially expanded state shown in FIG. 7, and from the partially expanded state shown in FIG. 7 to a fully expanded state shown in FIG. 8. The expansion of the pantograph coupling structure 216 is facilitated and/or achieved by the pivotal movement experienced by end 602 of bar 222 around pivot point 612 in direction 704, the pivotal movement experienced by end 604 of bar 224 around pivot point 616 in direction 706, the pivotal movement experienced by end 608 of bar 224 around pivot point 614 in direction 708, the pivotal movement experienced by end 606 of bar 222 around pivot point 618 in direction 710, and the sliding movement of end 606 of bar 222 in direction 620. The pantograph coupling structure's expansion is also facilitated by: the shortening or decrease in length of vertical batten $300_N$; and the pivotal motion of the bars 222, 224 about pivot point 600.

In an offset fed reflector system, the reflector 206 is located at a position that allows an offset 218 between the revolution axis 214 of the surface parabola and the edge 212 of the beam 252 (the beam is parallel to the revolution axis). The provision of the pantograph coupling structure 216 allows an increase in the offset 218 between the edge of the beam 212 and the revolution axis 214 when the perimeter truss reflector 206 is in its deployed position shown in FIG. 2. This offset is also referred to herein as an edge offset or can be described as a center offset between the revolution axis 214 and the center of the beam 250. The amount of offset is adjustable and selectable based on the configuration of the spacecraft 202. The amount of offset is selected so that: (1) the offset 218 is as small as possible; and/or (2) the spacecraft and any appendages 220 (e.g., solar panels, thrusters, etc.) clear and/or do not touch the beam 252 produced by the extendable reflector structure 206 during operation. As the offset 218 is increased, the reflector becomes more elliptical and the feed 234 is rotated more relative to the revolution axis 214. The pantograph coupling structure provides for more flexibility of the placement of the boom 204 and/or reflector 206 relative to the spacecraft 202. The pantograph coupling structure 216 is also designed so that the relative positions of the boom 204 and the extendable reflector structure 206 are maintained while in the deployed state.

In FIGS. 2-8, the bars 222, 224 of pantograph coupling structure 216 are shown with the same or equal lengths 720. The present solution is not limited in this regard. In other scenarios, the bars of the pantograph coupling structure have different lengths. An illustration of this configuration is provided in FIGS. 9-10.

Figure 9:
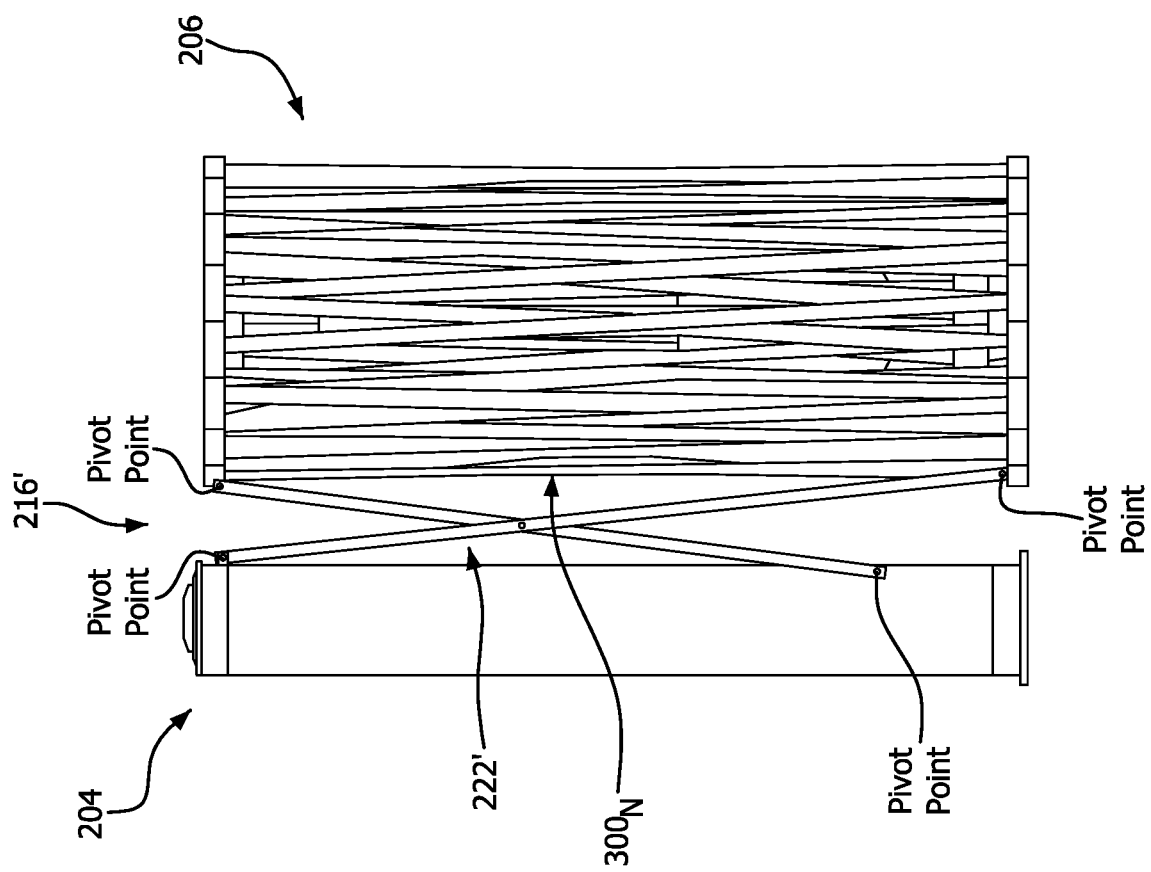
FIG. 9 provides an illustration of an extendable reflector structure coupled a boom via a pantograph coupling structure having bars with unequal lengths.
Figure 10:
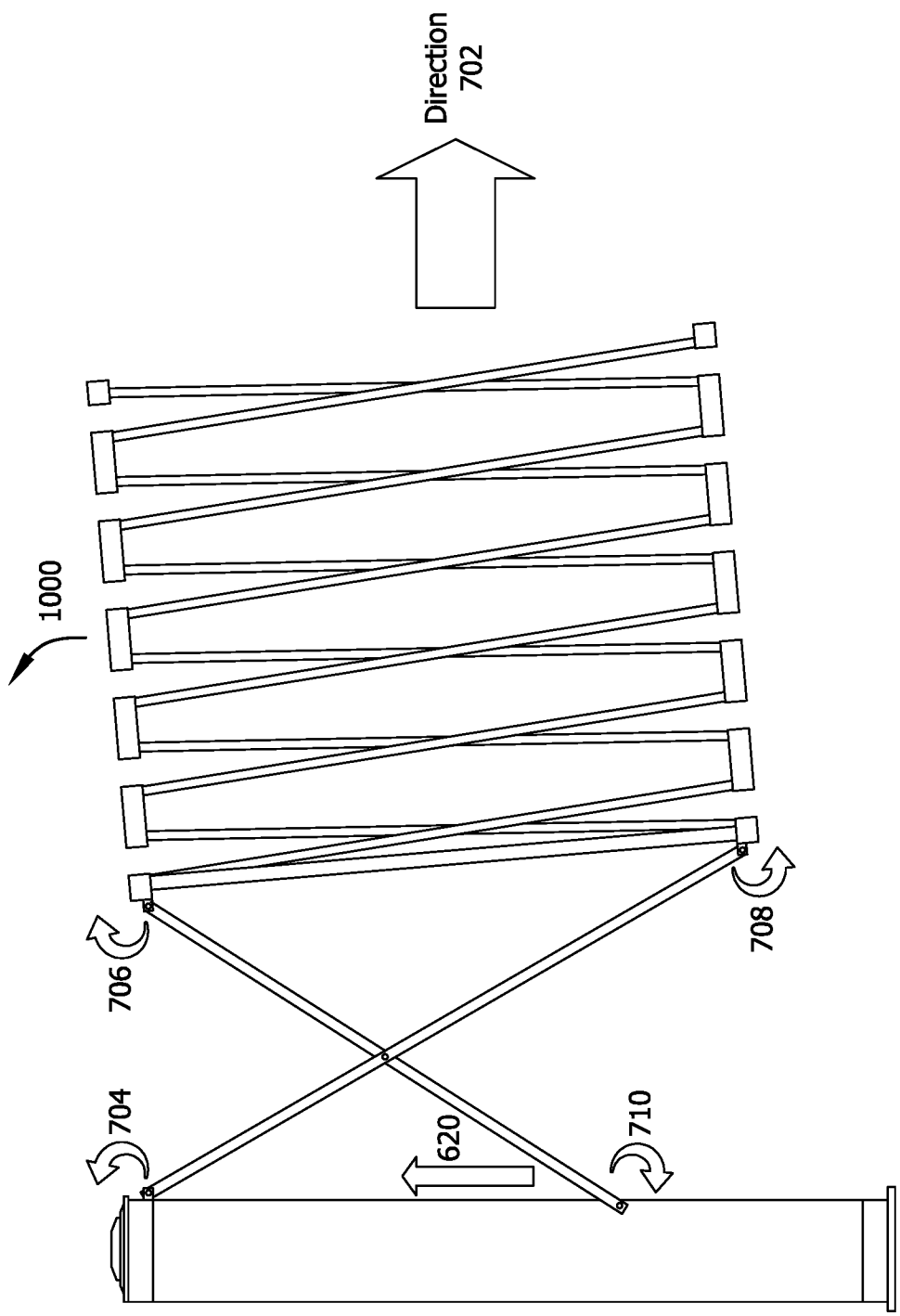
FIG. 10 provides an illustration of the extendable reflector structure and pantograph coupling structure of FIG. 9 is a partially expanded or deployed position.

As shown in FIGS. 9-10, the pantograph coupling structure 216' comprises a bar 222' with a shorter length as compared to bar 222. This difference in bar length not only allows for an adjustment of a horizontal distance between deployed boom 204 and extendable reflector structure 206, but also an adjustment in the orientation of the extendable reflector structure 206 relative to the boom 204. The adjustment in orientation is achieved by causing the extendable reflector structure 206 to rotate relative to the boom 204 as the pantograph coupling structure 216' expands. The rotation can be in direction 1000 as shown in FIG. 10 or in direction opposite to direction 1000 (not shown) depending on any given application.

Additionally, the present solution is not limited to the provision of a single pantograph coupling structure as shown in FIGS. 2-10. Any number of pantograph coupling structures can be provided in accordance with a given application. Illustrations showing the provision of multi-pantograph coupling structures for extendable reflector structures are provided in FIGS. 11-18.

Figure 11:
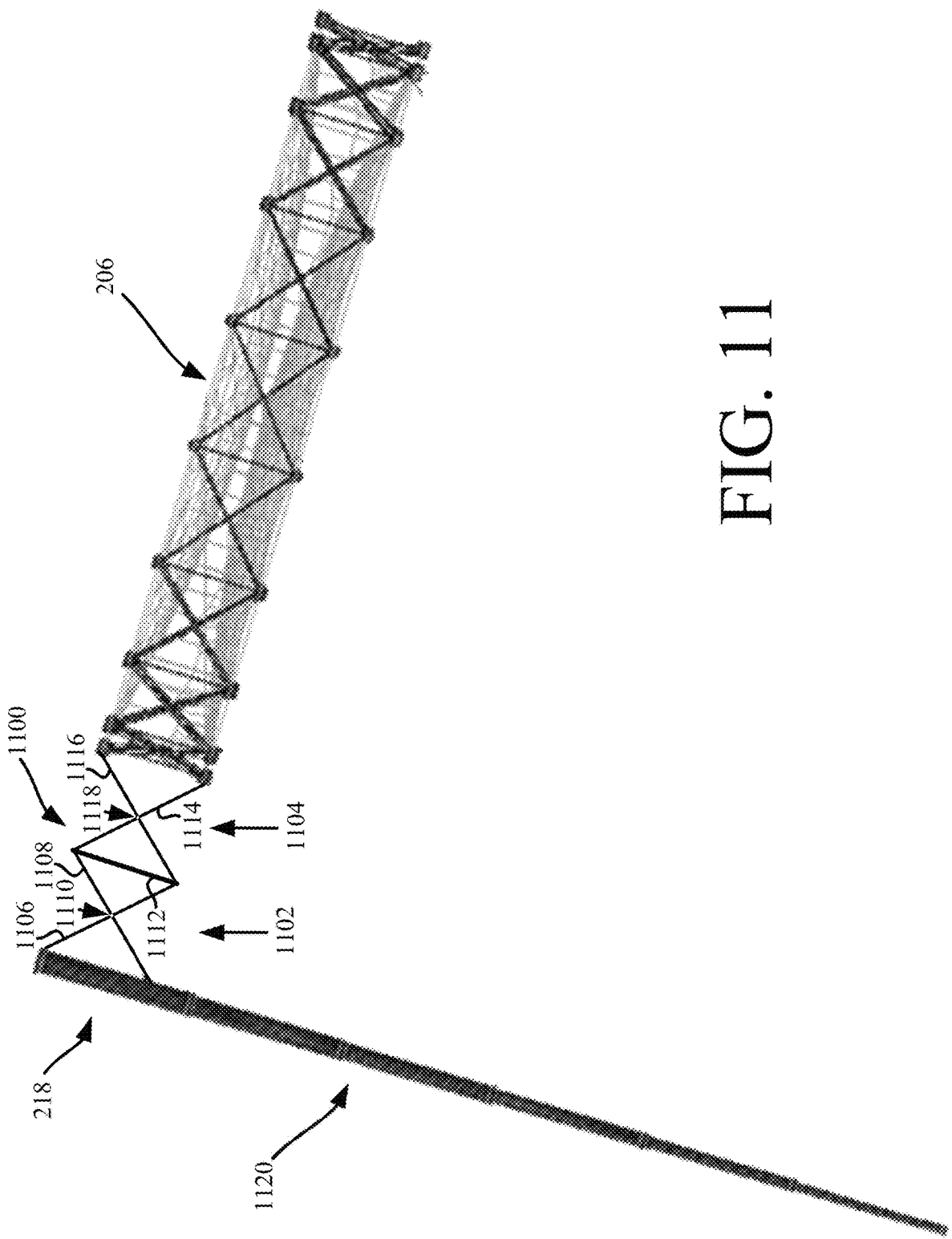
FIG. 11 provides an illustration of a boom, extendable reflector structure and pantograph coupling structure in a fully extended or deployed position.

Referring now to FIG. 11, there is provided an illustration of an illustrative pantograph coupling structure 1100 with multiple pantograph segments 1102, 1104. The pantograph segments 1102, 1104 are coupled to each other in a serial manner, and are disposed between a boom 1120 and the extendable reflector structure 206. In this way, the pantograph segments 1102, 1104 collectively provide a means to indirectly couple the extendable reflector structure 206 to the boom 1120. This indirect coupling allows the extendable reflector structure 206 to be coupled to and extend from a distal end portion 208 of the boom 1120 when the boom is in its extended position shown in FIG. 11. Boom 1120 is similar to boom 204 of FIG. 2. As such, the discussion provided above in relation to boom 204 is sufficient for understanding boom 1120.

Pantograph segment 1102 is similar to pantograph coupling structure 216 of FIGS. 2 and 6-8. Accordingly, pantograph segment 1102 comprises at least two rigid bars 1106, 1108 connected together at the middle thereof by a coupling mechanism 1110 (e.g., a pin). The bars 1106, 1108 are pivotable about the coupling mechanism 1110. Each bar 1106, 1108 has two opposing ends 1202/1208 or 1204/1206, and is formed of a rigid or semi-rigid material. Such material includes, but is not limited to, a metal, a plastic, and a composite. Each bar can comprise a solid bar or a hollow tube.

A first end 1202 of bar 1106 is securely and fixedly coupled to a top end of the boom 1120. End 1202 of bar 1106 is not able to slidingly move relative to boom 1120, but is able to pivot about a pivot pin 1212 that is adjacent to the top end of boom 1120.

Similarly, the second end 1208 of bar 1106 is securely and fixedly coupled to a bottom end of a telescoping vertical bar 1112. The second end 1208 of bar 1106 is not able to slidingly move relative to the telescoping vertical bar 1112, but is able to pivot about a pivot pin 1214 that is adjacent to the bottom end of the telescoping vertical bar 1112.

The first end 1204 of bar 1108 is securely and fixedly coupled to a top end of the telescoping vertical bar 1112. This end of the telescoping vertical bar 1112 is opposite to the end of the telescoping vertical bar 1112 to which end 1208 of bar 1106 is coupled. End 1204 of bar 1108 is not able to slidingly move relative to the telescoping vertical bar 1112, but is able to pivot about a pivot pin 1216 that is adjacent to the top end of the telescoping vertical bar 1112.

In contrast, the second end 1206 of bar 1108 is coupled to a bottom end of an outer most telescoping segment 1250 of the boom 1120 such that second end 1206 can slidingly engage boom 1120. The sliding engagement is achieved using a track, rollers, channel, wheels, or other mechanical sliding means. Tracks, rollers, channels, wheels and other mechanical sliding means are well known in the art, and therefore will not be described herein. The sliding engagement allows the second end 1206 of bar 1108 to move in opposing directions shown by arrows 1252, 1254. As end 1206 slides along boom 1120, bar 1108 may also pivot about pivot pins 1110 and 1226.

Pantograph segment 1104 is also similar to pantograph coupling structure 216 of FIGS. 2 and 6-8. Accordingly, pantograph segment 1104 comprises at least two bars 1114, 1116 connected together at the middle thereof by a coupling mechanism 1118 (e.g., a pin). The bars 1114, 1116 are pivotable about the coupling mechanism 1118. Each bar 1114, 1116 has two opposing ends 1218/1224 or 1220/1222, and is formed of a rigid or semi-rigid material. Such material includes, but is not limited to, a metal, a plastic, and a composite. Each bar can comprise a solid bar or a hollow tube.

A first end 1218 of bar 1114 is securely and fixedly coupled to a top end of telescoping vertical bar 1112. End 1218 of bar 1114 is not able to slidingly move relative to telescoping vertical bar 1112, but is able to pivot about a pivot pin 1228 that is adjacent to the top end of telescoping vertical bar 1112.

Similarly, the second end 1224 of bar 1114 is securely and fixedly coupled to a bottom end of the vertical batten $300_N$ of the of the support structure 210. The second end 1224 of bar 1114 is not able to slidingly move relative to the vertical batten $300_N$, but is able to pivot about a pivot pin 1230 that is adjacent to the bottom end of the vertical batten $300_N$.

The first end 1220 of bar 1116 is securely and fixedly coupled to a top end of the vertical batten $300_N$ of the support structure 210. End 1220 of bar 1116 is not able to slidingly move relative to the vertical batten $300_N$, but is able to pivot about a pivot pin 1232 that is adjacent to the top end of the vertical batten $300_N$.

The second end 1222 of bar 1116 is coupled to a bottom end of telescoping vertical bar 1112. End 1222 of bar 1116 is not able to slidingly move relative to the telescoping vertical bar 1112, but is able to pivot about a pivot pin 1234.

Figure 12:
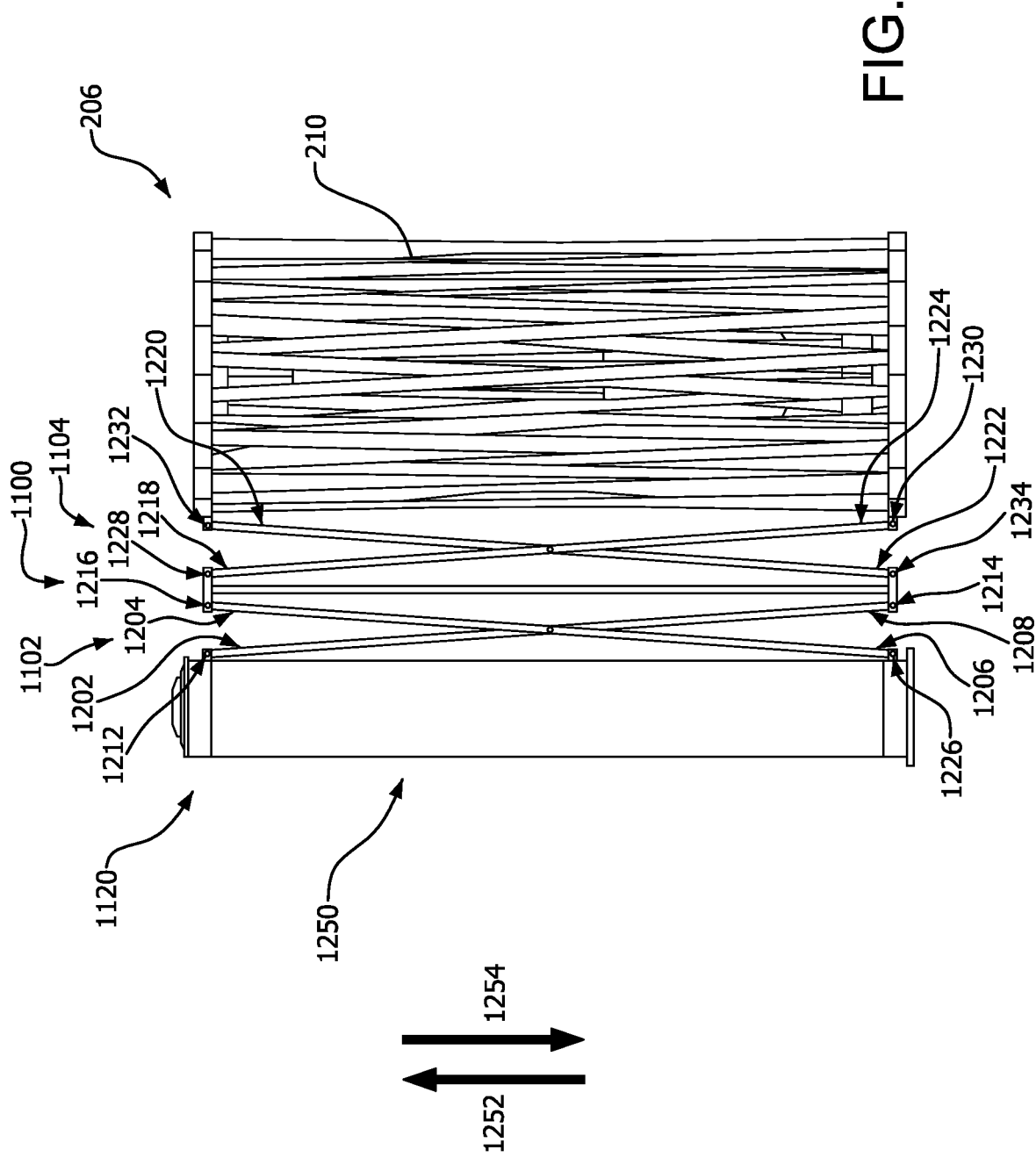
FIG. 12 provides an illustration of the boom, extendable reflector structure and pantograph coupling structure of FIG. 11 in a stored or stowed position.
Figure 13:
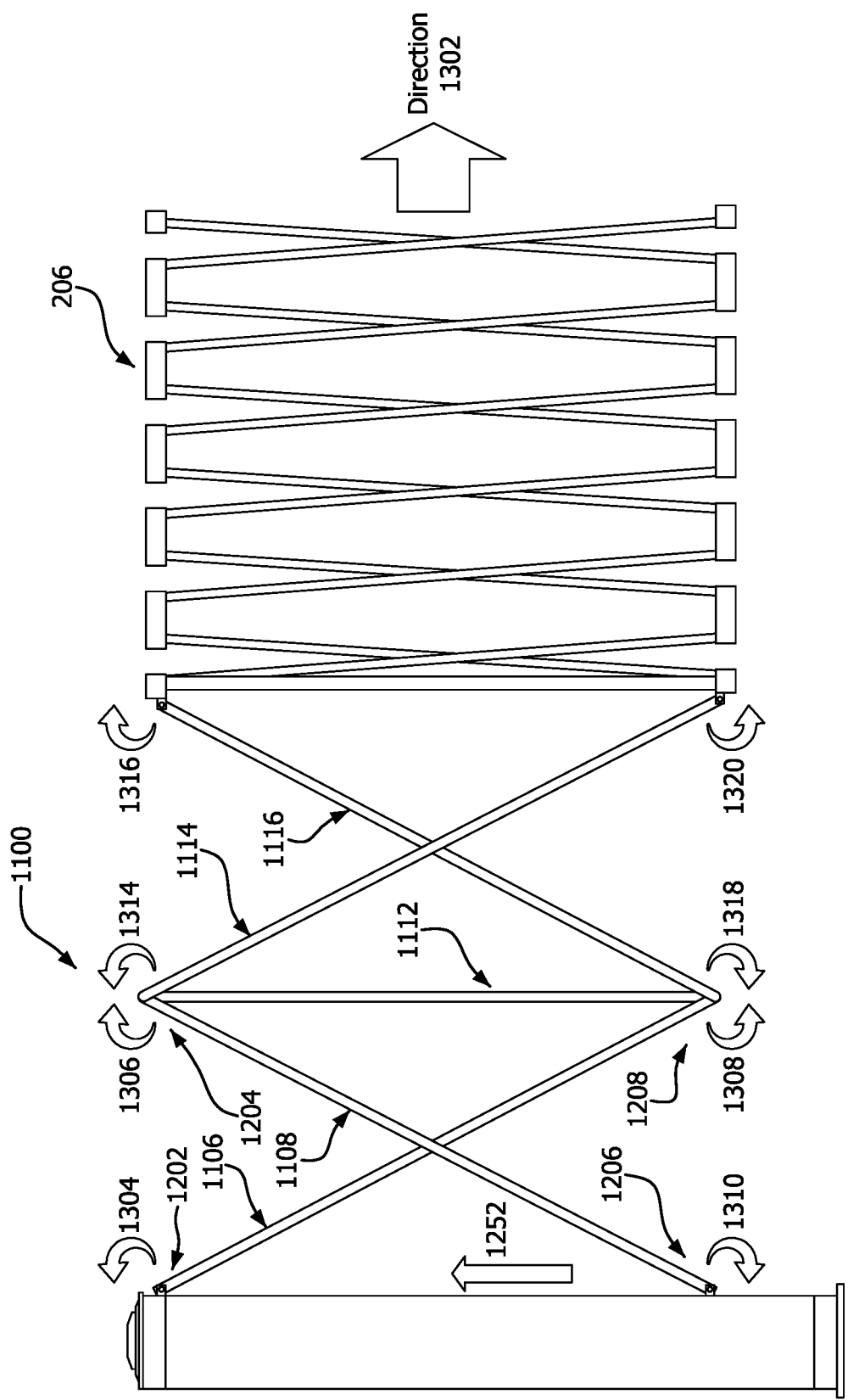
FIG. 13 provides an illustration of the boom, extendable reflector structure and pantograph coupling structure of FIGS. 11-12 being expanded or deployed.

As shown in FIG. 13, the pantograph coupling structure 1100 expands during the deployment of the extendable reflector structure 206. This expansion results in the transition of the pantograph coupling structure 1100 from a compressed state shown in FIG. 12 to a partially expanded state shown in FIG. 13, and from the partially expanded state shown in FIG. 13 to a fully expanded state shown in FIG. 11. The expansion of the pantograph coupling structure 1100 is facilitated by the pivotal movement experienced by end 1202 of bar 1106 about pivot point 1212 in direction 1304, the pivotal movement experienced by end 1204 of bar 1108 about pivot point 1216 in direction 1306, the pivotal movement experienced by end 1208 of bar 1106 about pivot point 1214 in direction 1308, the pivotal movement experienced by end 1206 of bar 1108 about pivot point 1226 in direction 1310, and the sliding movement of end 1206 of bar 1108 in direction 1252. The pantograph coupling structure's expansion is also facilitated by the shortening or decrease in length of telescoping vertical bar 1112, the pivot movement of bars 1106, 1108 about pivot point 1110, and the pivotal movement of bars 1114, 1116 about pivot point 1118.

In an offset fed reflector system, the reflector 206 is located at a position that allows an offset 218 between the revolution axis 214 of the surface parabola and the edge 212 of a beam 252 (the beam is parallel to the revolution axis). The provision of the pantograph coupling structure 216 allows an increase in the offset 218 between the edge of the beam 212 and the revolution axis 214 when the extendable reflector structure 206 is in its deployed position shown in FIG. 11. The amount of offset is adjustable and selectable based on the configuration of the base object. The amount of offset is selected so that: (1) the amount of offset is as small as possible; and/or (2) the base object and any appendages clear and/or do not touch the beam produced by the extendable reflector structure 1100 during operation. As the offset 218 is increased, the reflector becomes more elliptical and the feed 234 is rotated more relative to the revolution axis 214. The pantograph coupling structure 1100 is also designed so that the relative positions of the boom 204 and the extendable reflector structure 206 are maintained while in the deployed state.

In FIGS. 11-13, the bars 1106, 1108, 1114, 1116 of pantograph coupling structure 1100 are shown with equal or the same lengths. The present solution is not limited in this regard. In other scenarios, all or some of the bars of the pantograph coupling structure have different lengths. An illustration of this configuration is provided in FIG. 14.

Figure 14:
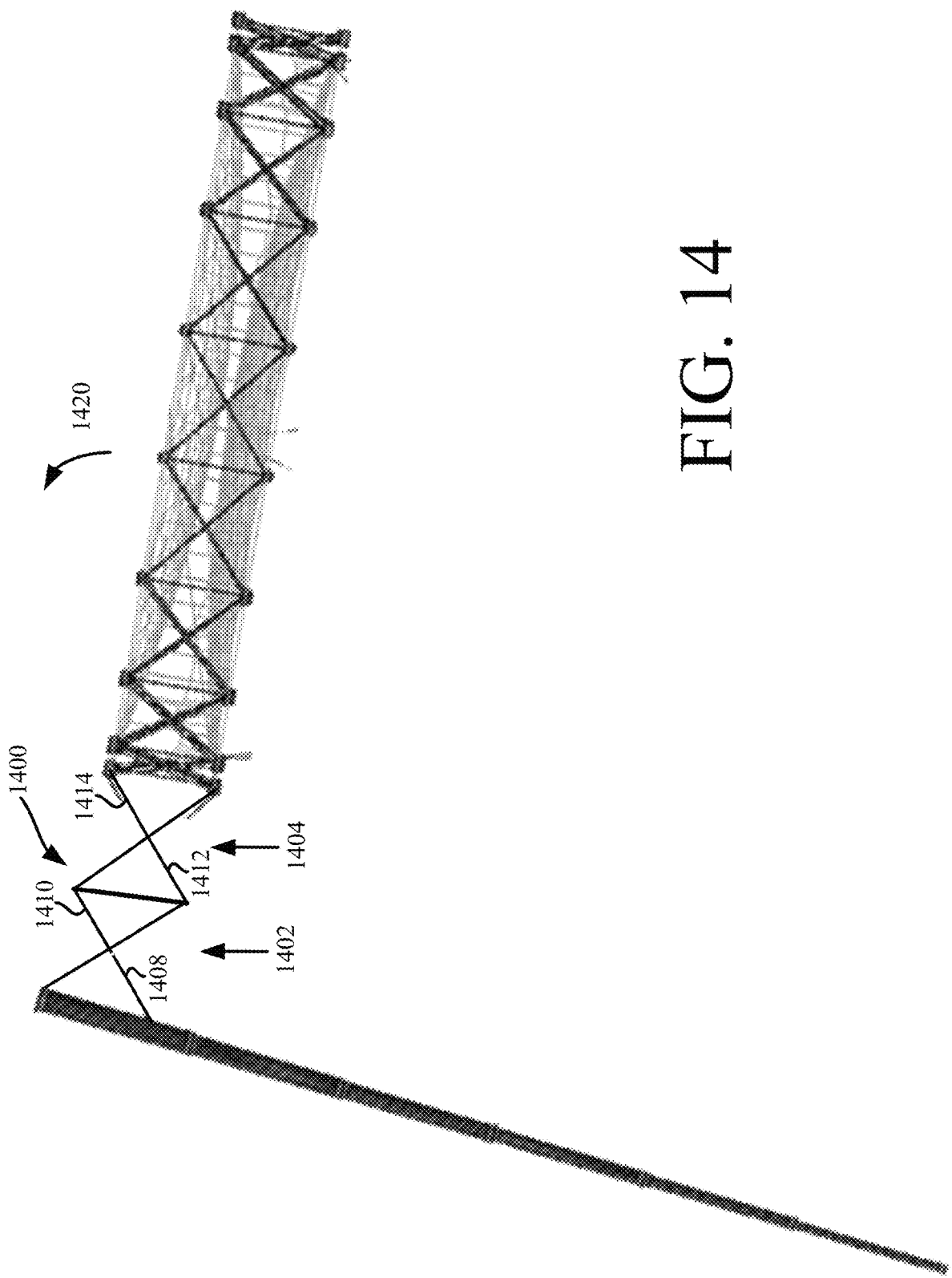
FIG. 14 provides an illustration of a boom, extendable reflector structure and pantograph coupling structure with unequal length members in a fully expended or deployed position.

As shown in FIG. 14, the pantograph coupling structure 1400 comprises two pantograph segments 1402, 1404. Each pantograph segment 1402, 1404 comprises two bars 1408/1410 or 1412/1414. Bar 1408 is shorter than bar 1410. Similarly, bar 1412 is shorter than bar 1414. Bars 1408 and 1412 have the same lengths, while bars 1410 and 1414 have the same lengths. This bar configuration not only allows for an adjustment of a horizontal distance between deployed boom and extendable reflector structure, but also an adjustment in the orientation of the extendable reflector structure relative to the boom. The adjustment in orientation is achieved by causing the extendable reflector structure to rotate relative to the boom as the pantograph coupling structure 1400 expands. The rotation can be in direction 1420 as shown in FIG. 14 or in direction opposite to direction 1420 (not shown).

The present solution is not limited to the multi-pantograph segment architectures shown in FIGS. 11-14. Other pantograph coupling structures with multiple pantograph segment architectures are discussed below in relation to FIGS. 15-18.

Figure 15:
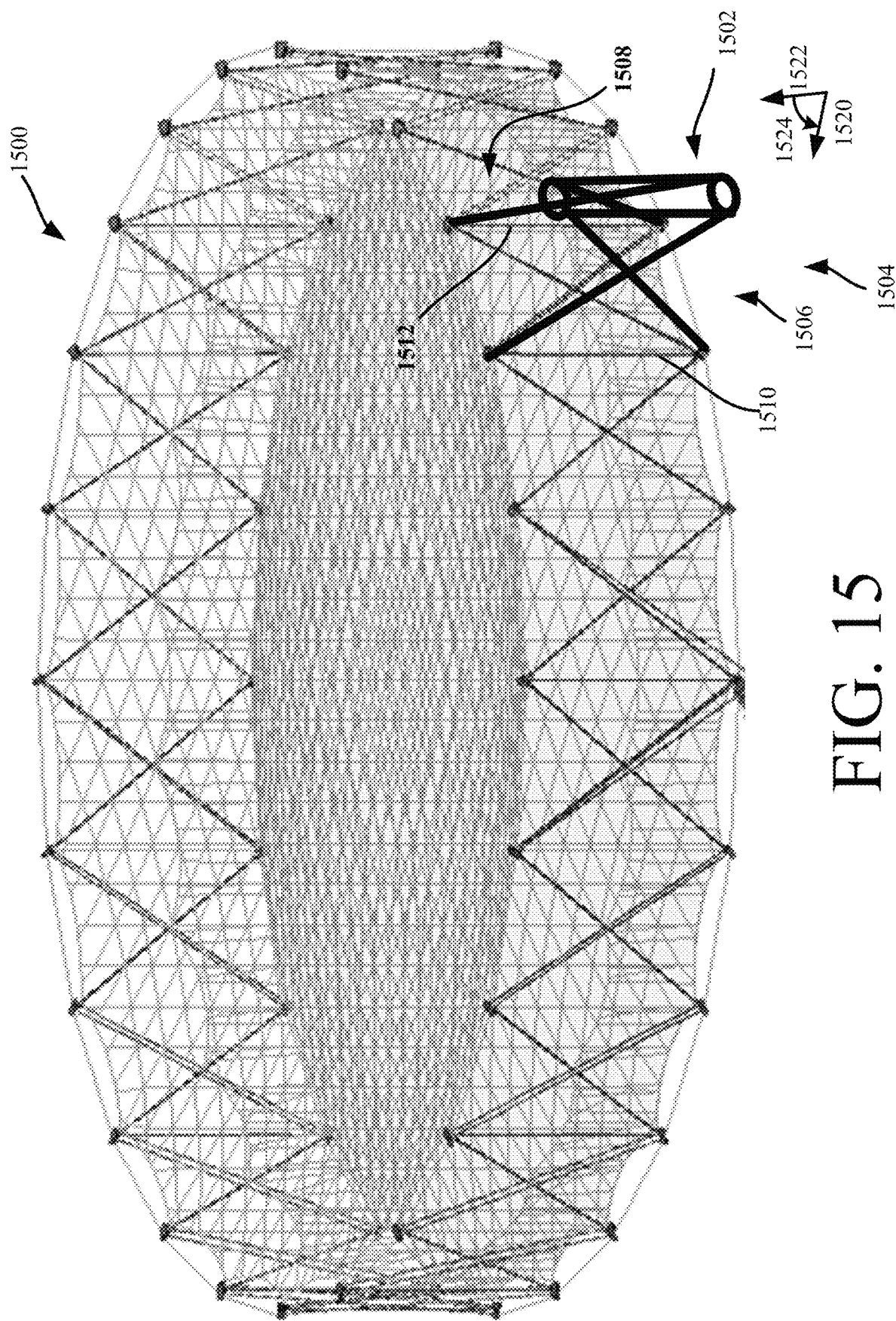
FIG. 15 provides an illustration of an extendable reflector structure coupled to a boom (shown in a transparent form) via a multi-pantograph coupling structure.
Figure 16:
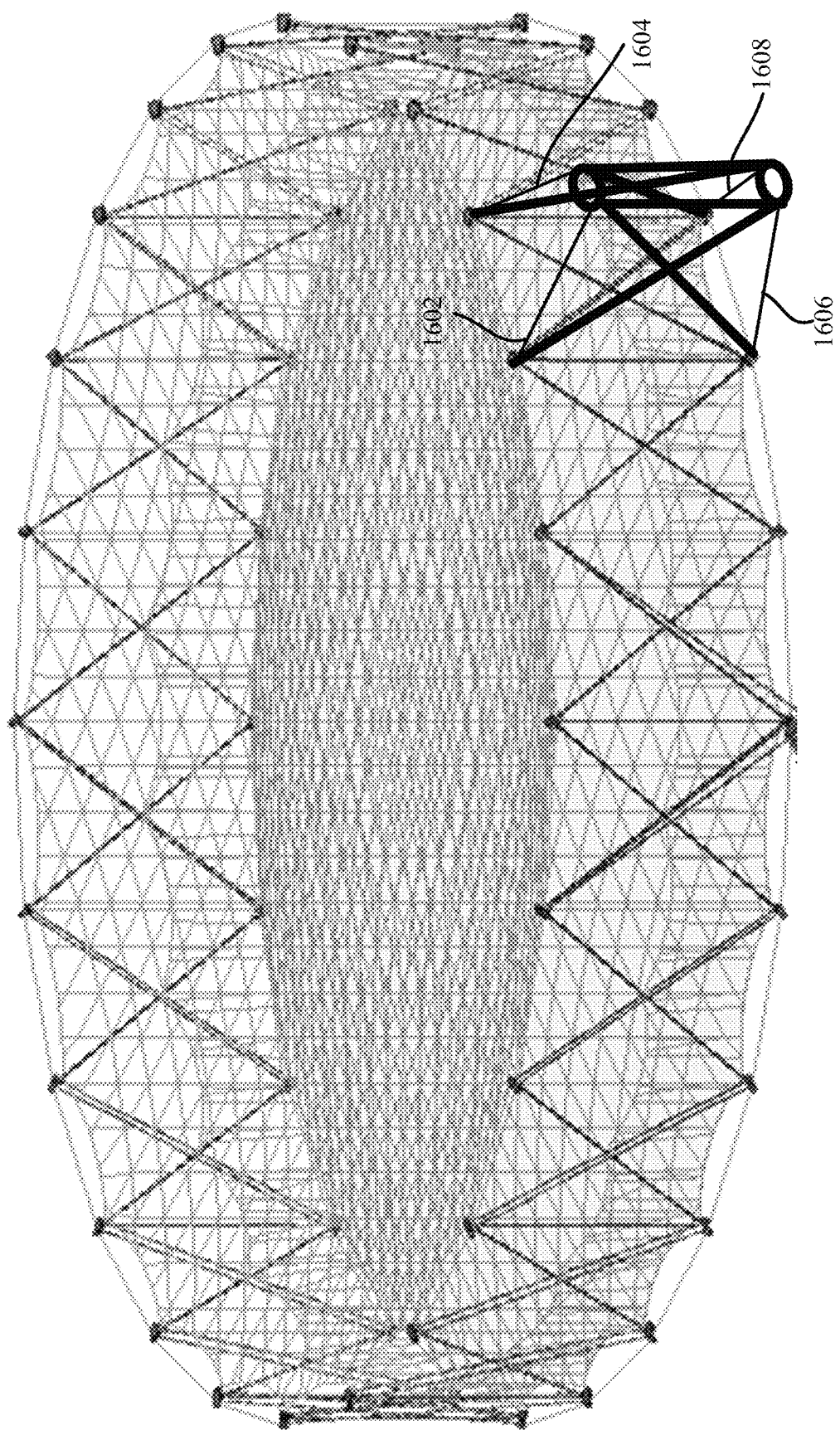
FIG. 16 provides an illustration of the multi-pantograph coupling structure of FIG. 15 with stiffening cords.

Referring now to FIG. 15, there is provided an illustration of a pantograph coupling structure 1504 disposed between an extendable reflector structure 1500 and a boom 1502. Boom 1502 is shown in a transparent state for clarity of discussion and/or illustration. The extendable reflector structure 1500 is the same as or similar to extendable reflector structure 206 discussed above. The boom 1502 is the same as or similar to boom 204 discussed above. The discussion of extendable reflector structure 206 and boom 204 provided above is sufficient for understanding extendable reflector structure 1500 and boom 1502. Notably, only a portion of boom 1502 is shown in FIG. 15. The boom 1502 can have any length selected in accordance with a given application.

As shown in FIG. 15, the pantograph coupling structure 1504 comprises two pantograph segments 1506, 1508. Each pantograph segment 1506, 1508 is coupled directly between the extendable reflector structure 1500 and the boom 1502. The pantograph segments 1506, 1508 extend in directions 1520, 1522 that are angled by an amount 1524 (e.g., 45 degrees) relative to each other. In this regard, a first pantograph segment 1506 is coupled to a first vertical batten 1510 of the extendable reflector structure 1500, while the second pantograph segment 1508 is coupled to a second vertical batten 1512 of the extendable reflector structure 1500. Each pantograph segment 1506, 1508 is the same as or similar to pantograph coupling structure 216 discussed above. The discussion of pantograph coupling structure 216 is sufficient for understanding pantograph segments 1506, 1508.

In some scenarios, the pantograph coupling structure 1504 can be stiffened using a plurality of cords 1600 or other folding tension elements (e.g., folding rods, tapes, straps, etc.). An illustration showing such stiffening cords 1602, 1604, 1606, 1608 for pantograph coupling structure 1504 is provided in FIG. 16. Although the stiffening cords are shown as residing outside of the bars, the present solution is not limited in this regard. The cords can alternatively be disposed within the bars of the pantograph coupling structure 1504.

Figure 17:
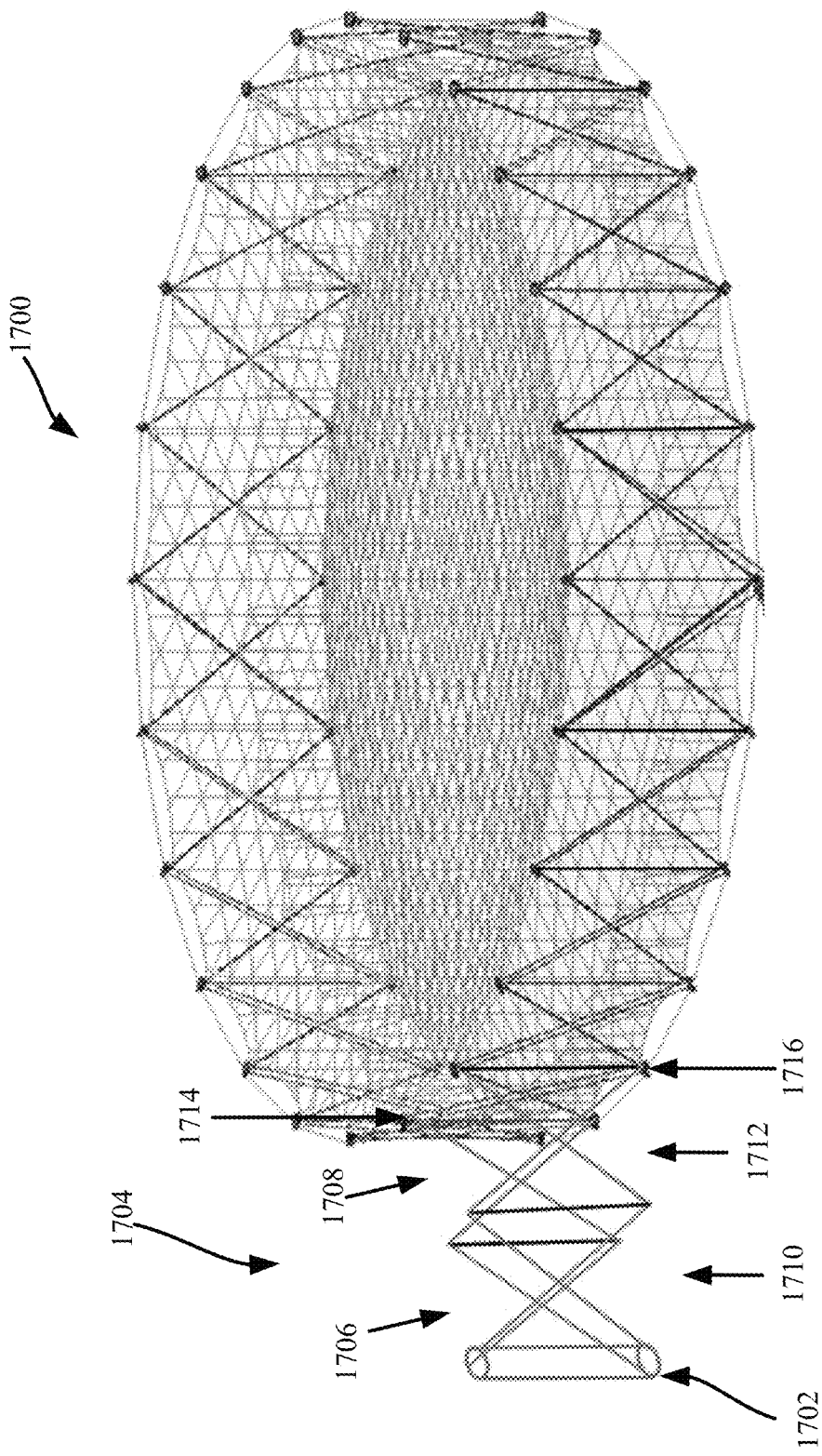
FIG. 17 provides an illustration of an extendable reflector structure coupled to a boom (shown in a transparent form) via a multi-pantograph, multi-segment coupling structure.
Figure 18:
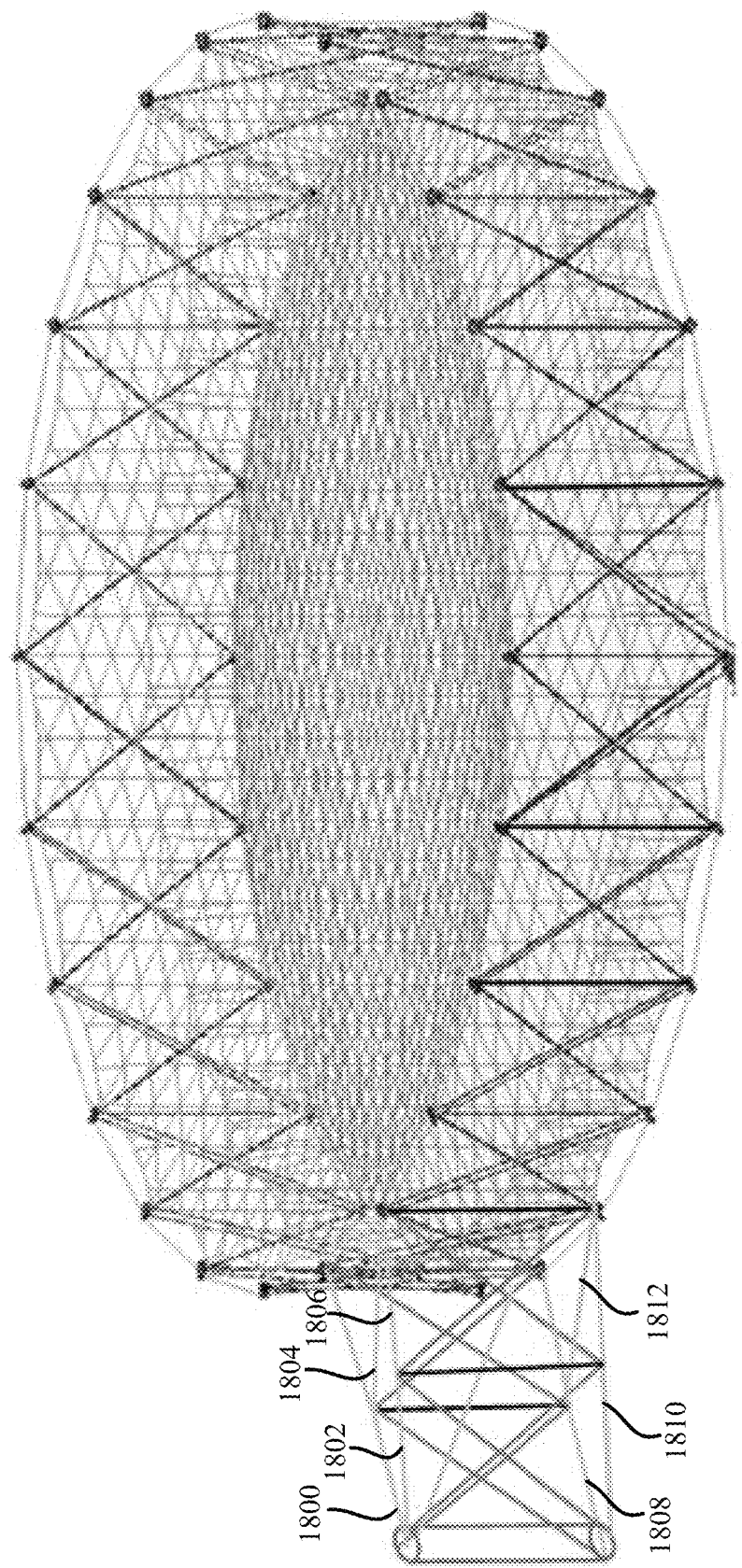
FIG. 18 provides an illustration of the multi-pantograph coupling structure of FIG. 17 with stiffening cords.

Referring now to FIG. 17, there is provided an illustration of a pantograph coupling structure 1704 disposed between an extendable reflector structure 1700 and a boom 1702. Boom 1702 is shown in a transparent state for clarity of discussion and/or illustration. The extendable reflector structure 1700 is the same as or similar to extendable reflector structure 206 discussed above. The boom 1702 is the same as or similar to boom 204 discussed above. The above discussion of extendable reflector structure 206 and boom 204 is sufficient for understanding extendable reflector structure 1700 and boom 1702. Notably, only a portion of boom 1702 is shown in FIG. 17. The boom 1702 can have any length selected in accordance with a given application.

As shown in FIG. 17, the pantograph coupling structure 1704 comprises two pantograph structures or sets of serially arranged pantograph segments 1706/1708 and 1710/1712. The present solution is not limited in this regard. The pantograph coupling structure can have any number of pantograph structures or sets of serially arranged pantograph segments selected in accordance with a given application.

Each set of pantograph segments is coupled directly between the extendable reflector structure 1700 and the boom 1702. The sets of pantograph segments extend in directions that are angled relative to each other (e.g., angled 45 degrees). In this regard, a first set of pantograph segments 1706, 1708 is coupled to a first vertical batten 1714 of the extendable reflector structure 1700, while the second pantograph segment 1710, 1712 is coupled to a second vertical batten 1716 of the extendable reflector structure 1700. Each set of pantograph segments 1706/1708, 1710/1712 is the same as or similar to pantograph coupling structure 1100 discussed above. The discussion provided above in relation to pantograph coupling structure 1100 is sufficient for understanding each set pantograph segments 1706/1708, 1710/1712.

In some scenarios, the pantograph coupling structure 1704 can be stiffened using a plurality of cords. An illustration showing such stiffening cords 1800, 1802, 1804, 1806, 1808, 1810, 1812 for pantograph coupling structure 1702 is provided in FIG. 18. Although the stiffening cords are shown as residing outside of the bars, the present solution is not limited in this regard. The cords can alternatively be disposed within the bars of the pantograph coupling structure 1704.

Figure 19:
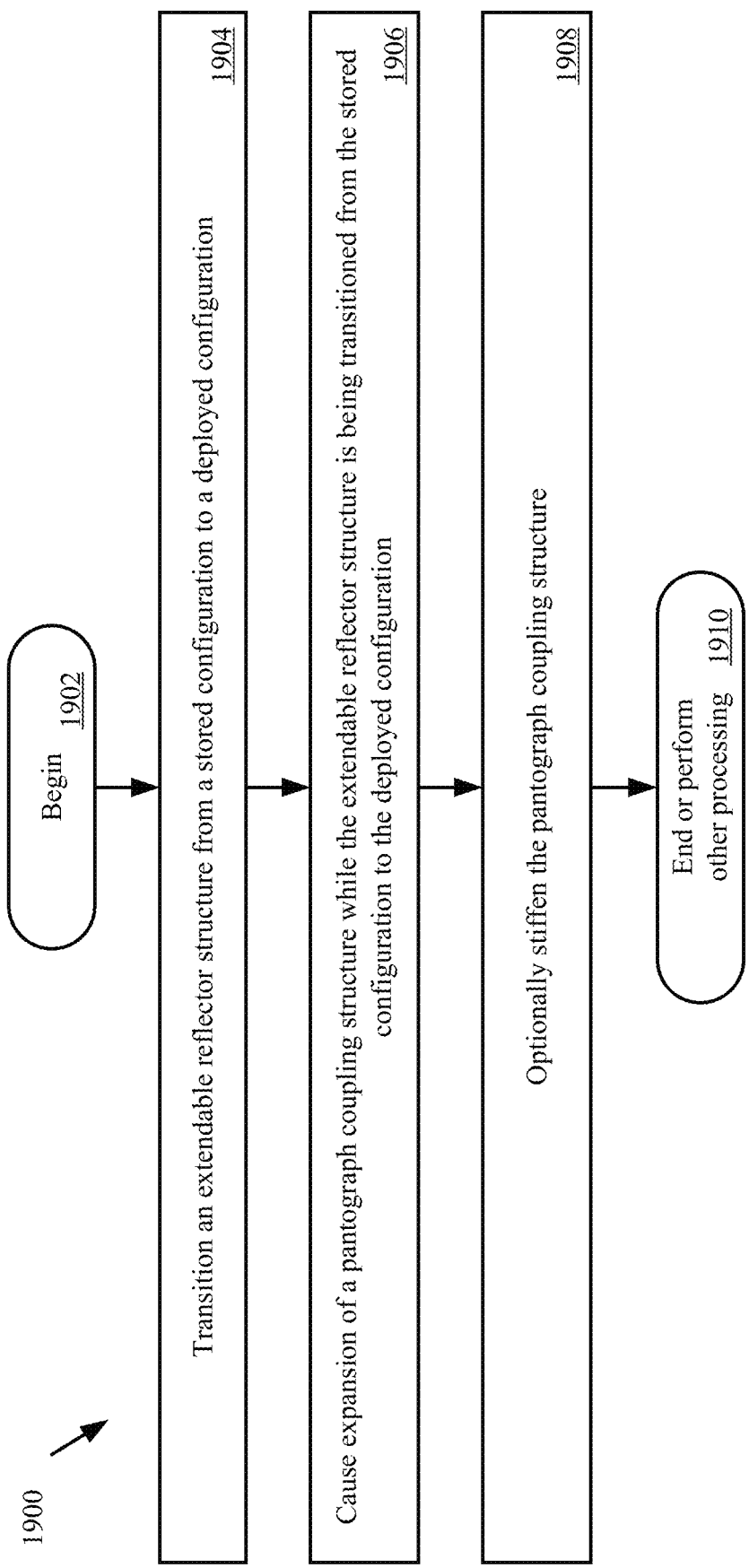
FIG. 19 provides an illustrative method for deploying an extendable reflector structure in accordance with the present solution.

Referring now to FIG. 19, there is provided an illustrative method 1900 for deploying an extendable reflector structure (e.g., extendable reflector structure 206 of FIG. 2). The method 1900 begins with 1902 and continues with 1904 where the extendable reflector structure is transitioned from a stored configuration to a deployed configuration. Techniques for transitioning extendable reflector structures between stored configurations and deployed configurations are well known in the art, and therefore will not be described herein. Any known or to be known technique for transitioning extendable reflector structures between stored configurations and deployed configurations can be used herein. A height of the extendable reflector structure may be reduced during the transitioning.

Next in 1906, expansion of a pantograph coupling structure (e.g., pantograph structure 216 of FIGS. 2-8, 216' of FIGS. 9-10, 1100 of FIGS. 11-13, 1400 of FIG. 14, 1504 of FIG. 15, or 1704 of FIG. 17) is caused while the extendable reflector structure is being transitioned from the stored configuration (e.g., shown in FIG. 6, FIG. 9, or FIG. 12) to the deployed configuration (e.g., shown in FIG. 2, FIG. 8, FIG. 11, FIG. 14, FIG. 15, or FIG. 17). The pantograph coupling structure indirectly couples the extendable reflector structure to a boom (e.g., boom 204 of FIGS. 2-10, 1120 of FIGS. 11-13, 1502 of FIG. 15, or 1702 of FIG. 17) such that a beam (e.g., beam 252 of FIG. 2) produced by the extendable reflector structure during operation is offset from a focal axis (e.g., focal axis 214 of FIG. 2) of the extendable reflector structure by a certain amount (e.g., amount 218 of FIG. 2).

Thereafter, method 1900 may optionally continue with 1908. In 1908, the pantograph coupling structure is stiffened using a plurality of cords (e.g., cords 1602-1608 of FIG. 16, or cords 1800-1812 of FIG. 18). The tensioning of the cords may occur at the end of the deployment of the pantograph structure and serve to stop the deployment. Subsequently, 1910 is performed where method 1900 ends or other processing is performed.

In some scenarios, the extendable reflector structure comprises a flexible antenna reflector surface (e.g., antenna reflector surface 226 of FIG. 2), a surface shaping cord network (e.g., surface shaping cord network 228 of FIG. 2), and a support structure (e.g., support structure 210 of FIG. 2). The pantograph coupling structure is coupled to at least one vertical batten (e.g., vertical batten 300 of FIG. 3) of the support structure.

In those or other scenarios, the expansion of the pantograph coupling structure is achieved by causing a pivotal movement of a first end (e.g., end 602 of FIG. 6) of a first bar (e.g., bar 222 of FIG. 2) around a first pivot point (e.g., pivot point 612 of FIG. 6) adjacent to the boom, a pivotal movement of a first end (e.g., end 604 of FIG. 6) of a second bar (e.g., bar 224 of FIG. 2) around a second pivot point (e.g., pivot point 616 of FIG. 6) adjacent to the expandable reflector structure, a pivotal movement by a second end (e.g., end 608 of FIG. 6) of the first bar around a third pivot point (e.g., pivot point 614 of FIG. 6) adjacent to the expandable reflector structure, a pivotal movement by a second end (e.g., end 606 of FIG. 6) of the second bar around a fourth pivot point (e.g., pivot point 618 of FIG. 6) adjacent to the boom, a sliding engagement of the second end (e.g., end 606 of FIG. 6) of the second bar to the boom, and a pivotal movement of the first and second bars relative to each other (e.g., about pivot point 600 of FIG. 6). The expansion of the pantograph coupling structure may further achieved by a decrease in length of a vertical batten of the extendable reflector structure to which the first and second bars are coupled. The first and second bars can have the same or different lengths.

In those or other scenarios, the pantograph coupling structure comprises at least two pantograph segments (e.g., pantograph segments 1102, 1104 of FIG. 11 or segments 1402, 1404 of FIG. 14) coupled in series between the boom and the extendable reflector structure. Alternatively or additionally, the pantograph coupling structure comprises at least two pantograph structures (e.g., pantograph structures 1502, 1504 of FIG. 15, or pantograph structures 1706/1708, 1710/1712 of FIG. 17) coupled between the boom and the extendable reflector structure so as to be angled relative to each other. Each of the at least two pantograph structures comprises: a single pantograph segment connected in series between the boom and the extendable reflector structure; or two or more pantograph segments connected in series between the boom and the extendable reflector structure.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for deploying an extendable reflector structure, comprising:
    transitioning the extendable reflector structure from a stored configuration to a deployed configuration, the extendable reflector structure comprising a flexible antenna reflector surface coupled to a perimeter hoop support structure; and
    causing expansion of a pantograph coupling structure while the perimeter hoop support structure is being unfolded as the extendable reflector structure transitions from the stored configuration to the deployed configuration, where the pantograph coupling structure is disposed between the perimeter hoop support structure of the extendable reflector structure and a boom such that a beam produced by the extendable reflector structure during operation is offset from a focal axis of the extendable reflector structure by a certain amount.

2. The method according to claim 1, wherein a height of the extendable reflector structure is reduced during the transitioning.

3. The method according to claim 1, wherein the perimeter hoop support structure of the extendable reflector structure comprises a pantograph structure.

4. The method according to claim 3, wherein the pantograph coupling structure is coupled to a vertical batten of the perimeter hoop support structure.

5. The method according to claim 1, wherein the expansion of the pantograph coupling structure is achieved by causing a pivotal movement of a first end of a first bar around a first pivot point adjacent to the boom, a pivotal movement of a first end of a second bar around a second pivot point adjacent to the extendable reflector structure, a pivotal movement by a second end of the first bar around a third pivot point adjacent to the extendable reflector structure, a pivotal movement by a second end of the second bar around a fourth pivot point adjacent to the boom, a sliding engagement of the second end of the second bar to the boom, and a pivotal movement of the first and second bars relative to each other.

6. The method according to claim 5, wherein the expansion of the pantograph coupling structure is further achieved by a decrease in length of a vertical batten of the extendable reflector structure to which the first and second bars are coupled.

7. The method according to claim 5, wherein the first and second bars have different lengths.

8. The method according to claim 5, wherein the first and second bars have equal lengths.

9. A method for deploying an extendable reflector structure, comprising:
    transitioning the extendable reflector structure from a stored configuration to a deployed configuration; and
    causing expansion of a pantograph coupling structure while the extendable reflector structure is being transitioned from the stored configuration to the deployed configuration, where the pantograph coupling structure indirectly couples the extendable reflector structure to a boom such that a beam produced by the extendable reflector structure during operation is offset from a focal axis of the extendable reflector structure by a certain amount;
    wherein the pantograph coupling structure comprises at least two pantograph segments coupled in series between the boom and the extendable reflector structure.

10. A method for deploying an extendable reflector structure, comprising:
    transitioning the extendable reflector structure from a stored configuration to a deployed configuration; and
    causing expansion of a pantograph coupling structure while the extendable reflector structure is being transitioned from the stored configuration to the deployed configuration, where the pantograph coupling structure indirectly couples the extendable reflector structure to a boom such that a beam produced by the extendable reflector structure during operation is offset from a focal axis of the extendable reflector structure by a certain amount;
    wherein the pantograph coupling structure comprises at least two pantograph structures coupled in parallel between the boom and the extendable reflector structure so as to be angled relative to each other.

11. The method according to claim 10, wherein each of the at least two pantograph structures comprises a single pantograph segment connected in series between the boom and the extendable reflector structure.

12. The method according to claim 10, wherein each of the at least two pantograph structures comprises two or more pantograph segments connected in series between the boom and the extendable reflector structure.

13. The method according to claim 1, further comprising stiffening the pantograph coupling structure using a plurality of cords.

14. A system, comprising:
    a boom;
    an extendable reflector structure comprising a flexible antenna reflector surface coupled to a perimeter hoop support structure that is transitionable from a stored configuration to a deployed configuration; and
    a pantograph coupling structure that (a) is disposed between the boom and the perimeter hoop support structure, (b) expands while the perimeter hoop support structure enlarges as the extendable reflector structure is being transitioned from the stored configuration to the deployed configuration, and (c) facilitates an offset of a beam produced by the extendable reflector structure during operation from a focal axis of the extendable reflector structure by a certain amount.

15. The system according to claim 14, wherein a height of the extendable reflector structure is reduced during the transition from the stored configuration to the deployed configuration.

16. The system according to claim 14, wherein the perimeter hoop support structure comprises a pantograph structure.

17. The system according to claim 16, wherein the pantograph coupling structure is coupled to a vertical batten of the perimeter hoop support structure.

18. The system according to claim 14, wherein an expansion of the pantograph coupling structure is achieved by a pivotal movement of a first end of a first bar around a first pivot point adjacent to the boom, a pivotal movement of a first end of a second bar around a second pivot point adjacent to the extendable reflector structure, a pivotal movement by a second end of the first bar around a third pivot point adjacent to the extendable reflector structure, a pivotal movement by a second end of the second bar around a fourth pivot point adjacent to the boom, a sliding engagement of the second end of the second bar to the boom, and a pivotal movement of the first and second bars relative to each other.

19. The system according to claim 18, wherein the expansion of the pantograph coupling structure is further achieved by a decrease in length of a vertical batten of the extendable reflector structure to which the first and second bars are coupled.

20. The system according to claim 18, wherein the first and second bars have different lengths.

21. The system according to claim 18, wherein the first and second bars have equal lengths.

22. A system, comprising:
a boom;
an extendable reflector structure that is transitionable from a stored configuration to a deployed configuration; and
a pantograph coupling structure that (a) expands while the extendable reflector structure is being transitioned from the stored configuration to the deployed configuration, and (b) indirectly couples the extendable reflector structure to the boom such that a beam produced by the extendable reflector structure during operation is offset from a focal axis of the extendable reflector structure by a certain amount;
wherein the pantograph coupling structure comprises at least two pantograph segments coupled in series between the boom and the extendable reflector structure.

23. A system, comprising:
a boom;
an extendable reflector structure that is transitionable from a stored configuration to a deployed configuration; and
a pantograph coupling structure that (a) expands while the extendable reflector structure is being transitioned from the stored configuration to the deployed configuration, and (b) indirectly couples the extendable reflector structure to the boom such that a beam produced by the extendable reflector structure during operation is offset from a focal axis of the extendable reflector structure by a certain amount;
wherein the pantograph coupling structure comprises at least two pantograph structures coupled between the boom and the extendable reflector structure so as to be angled relative to each other.

24. The system according to claim 23, wherein each of the at least two pantograph structures comprises a single pantograph segment connected in series between the boom and the extendable reflector structure.

25. The system according to claim 23, wherein each of the at least two pantograph structures comprises two or more pantograph segments connected in series between the boom and the extendable reflector structure.

26. The system according to claim 14, further comprising cords that stiffen the pantograph coupling structure.

\* \* \* \* \*